(12) United States Patent
Steinberger et al.

(10) Patent No.: US 12,078,231 B2
(45) Date of Patent: Sep. 3, 2024

(54) INLINE ELECTROMECHANICAL VARIABLE TRANSMISSION SYSTEM

(71) Applicant: Oshkosh Corporation, Oshkosh, WI (US)

(72) Inventors: David J. Steinberger, Oshkosh, WI (US); Jon J. Morrow, Neenah, WI (US); Andrew J. Kotloski, Oshkosh, WI (US); Eric E. Braun, Neenah, WI (US)

(73) Assignee: Oshkosh Corporation, Oshkosh, WI (US)

( * ) Notice: Subject to any disclaimer, the term of this patent is extended or adjusted under 35 U.S.C. 154(b) by 371 days.

(21) Appl. No.: 17/156,122

(22) Filed: Jan. 22, 2021

(65) Prior Publication Data
US 2021/0140517 A1 May 13, 2021

Related U.S. Application Data

(63) Continuation-in-part of application No. 16/275,059, filed on Feb. 13, 2019, now Pat. No. 10,982,736.
(Continued)

(51) Int. Cl.
*F16H 3/72* (2006.01)
*B60K 6/365* (2007.10)
(Continued)

(52) U.S. Cl.
CPC ............ *F16H 3/727* (2013.01); *B60K 6/365* (2013.01); *B60K 6/387* (2013.01); *B60K 6/442* (2013.01);
(Continued)

(58) Field of Classification Search
CPC .......... F16H 3/727; F16H 3/728; B60K 6/365
See application file for complete search history.

(56) References Cited

U.S. PATENT DOCUMENTS 1,951,089 A 3/1934 Fielder
3,524,069 A 8/1970 Stepanov et al.
(Continued)

FOREIGN PATENT DOCUMENTS

CN 101107460 1/2008
CN 101194114 A 6/2008
(Continued)

OTHER PUBLICATIONS

US 7,154,246 B2, 12/2006, Heap (withdrawn)
(Continued)

*Primary Examiner* — Derek D Knight
(74) *Attorney, Agent, or Firm* — Foley & Lardner LLP

(57) ABSTRACT

A drive system for a vehicle includes a first electromagnetic device directly coupled to a first planetary gear set and a second electromagnetic device directly coupled to a second planetary gear set. In a first mode of operation, a clutch is engaged to couple the second planetary gear set to the first planetary gear set and a brake is disengaged to allow rotation of the second planetary gear set and in a second mode of operation, the brake is engaged to limit rotation of the second planetary gear set and the clutch is disengaged.

12 Claims, 8 Drawing Sheets

Related U.S. Application Data which is a continuation-in-part of application No. 15/725,154, filed on Oct. 4, 2017, now Pat. No. 10,578,195, which is a continuation-in-part of application No. 15/595,443, filed on May 15, 2017, now Pat. No. 9,970,515, which is a continuation of application No. 14/624,285, filed on Feb. 17, 2015, now Pat. No. 9,651,120, said application No. 15/725,154 is a continuation-in-part of application No. 15/595,511, filed on May 15, 2017, now Pat. No. 10,029,555, which is a continuation of application No. 14/792,532, filed on Jul. 6, 2015, now Pat. No. 9,650,032, which is a continuation-in-part of application No. 14/624,285, filed on Feb. 17, 2015, now Pat. No. 9,651,120, said application No. 15/725,154 is a continuation-in-part of application No. 15/601,670, filed on May 22, 2017, now Pat. No. 9,908,520, which is a continuation of application No. 14/792,535, filed on Jul. 6, 2015, now Pat. No. 9,656,659, said application No. 15/725,154 is a continuation-in-part of application No. 15/698,415, filed on Sep. 7, 2017, now abandoned, which is a continuation-in-part of application No. 15/693,176, filed on Aug. 31, 2017, now Pat. No. 10,584,775, which is a continuation-in-part of application No. 14/918,221, filed on Oct. 20, 2015, now Pat. No. 10,421,350.

(60) Provisional application No. 62/964,998, filed on Jan. 23, 2020, provisional application No. 62/630,586, filed on Feb. 14, 2018.

(51) Int. Cl.
  *B60K 6/387* (2007.10)
  *B60K 6/442* (2007.10)
  *B60K 6/445* (2007.10)
  B60K 6/38 (2007.10)
  F16H 37/02 (2006.01)
  F16H 37/08 (2006.01)

(52) U.S. Cl.
  CPC ............. *B60K 6/445* (2013.01); *F16H 3/728* (2013.01); *B60K 2006/381* (2013.01); *F16H 37/02* (2013.01); *F16H 37/084* (2013.01); *F16H 2037/0866* (2013.01); *F16H 2037/0873* (2013.01); *F16H 2200/20* (2013.01); *F16H 2200/2002* (2013.01); *F16H 2200/2007* (2013.01); *F16H 2200/203* (2013.01); *F16H 2200/2043* (2013.01); *Y02T 10/62* (2013.01); *Y10S 903/917* (2013.01)

(56) References Cited

U.S. PATENT DOCUMENTS

| | | |
|---|---|---|
| 3,690,559 A | 9/1972 | Rudloff |
| 3,764,867 A | 10/1973 | Smith |
| 3,799,284 A | 3/1974 | Hender |
| 3,865,209 A | 2/1975 | Aihara et al. |
| 3,966,067 A | 6/1976 | Reese |
| 4,021,704 A | 5/1977 | Norbeck |
| 4,088,934 A | 5/1978 | D'Atre et al. |
| 4,097,925 A | 6/1978 | Butler, Jr. |
| 4,113,045 A | 9/1978 | Downing, Jr. |
| 4,196,785 A | 4/1980 | Downing, Jr. |
| 4,292,531 A | 9/1981 | Williamson |
| 4,319,140 A | 3/1982 | Paschke |
| 4,336,418 A | 6/1982 | Hoag |
| 4,347,907 A | 9/1982 | Downing, Jr. |
| 4,411,171 A | 10/1983 | Fiala |
| 4,423,362 A | 12/1983 | Konrad et al. |
| 4,423,794 A | 1/1984 | Beck |
| 4,444,285 A | 4/1984 | Stewart et al. |
| 4,461,988 A | 7/1984 | Plunkett |
| 4,533,011 A | 8/1985 | Heidemeyer et al. |
| 4,562,894 A | 1/1986 | Yang |
| 4,719,361 A | 1/1988 | Brubaker |
| 4,760,275 A | 7/1988 | Sato et al. |
| 4,774,399 A | 9/1988 | Fujita et al. |
| 4,774,811 A | 10/1988 | Kawamura |
| 4,809,177 A | 2/1989 | Windle et al. |
| 4,953,646 A | 9/1990 | Kim |
| 4,966,242 A | 10/1990 | Baillargeon |
| 4,985,845 A | 1/1991 | Goetz et al. |
| 5,067,932 A | 11/1991 | Edwards |
| 5,081,832 A | 1/1992 | Mowill |
| 5,120,282 A | 6/1992 | Fjaellstroem |
| 5,168,946 A | 12/1992 | Dorgan |
| 5,180,456 A | 1/1993 | Schultz et al. |
| 5,195,600 A | 3/1993 | Dorgan |
| 5,201,629 A | 4/1993 | Simpson et al. |
| 5,227,703 A | 7/1993 | Boothe et al. |
| 5,263,524 A | 11/1993 | Boardman |
| 5,264,763 A | 11/1993 | Avitan |
| 5,289,093 A | 2/1994 | Jobard |
| 5,291,960 A | 3/1994 | Brandenburg et al. |
| 5,343,971 A | 9/1994 | Heidelberg et al. |
| 5,345,154 A | 9/1994 | King |
| 5,369,540 A | 11/1994 | Konrad et al. |
| 5,389,825 A | 2/1995 | Ishikawa et al. |
| 5,409,425 A | 4/1995 | Shibahata |
| 5,417,299 A | 5/1995 | Pillar et al. |
| 5,418,437 A | 5/1995 | Couture et al. |
| 5,448,561 A | 9/1995 | Kaiser et al. |
| 5,498,208 A | 3/1996 | Braun |
| 5,501,567 A | 3/1996 | Lanzdorf et al. |
| 5,504,655 A | 4/1996 | Underwood et al. |
| 5,508,594 A | 4/1996 | Underwood et al. |
| 5,508,689 A | 4/1996 | Rado et al. |
| 5,516,379 A | 5/1996 | Schultz |
| 5,538,274 A | 7/1996 | Schmitz et al. |
| 5,558,175 A | 9/1996 | Sherman |
| 5,558,588 A | 9/1996 | Schmidt |
| 5,558,589 A | 9/1996 | Schmidt |
| 5,558,595 A | 9/1996 | Schmidt et al. |
| 5,568,023 A | 10/1996 | Grayer et al. |
| 5,575,730 A | 11/1996 | Edwards et al. |
| 5,575,737 A | 11/1996 | Weiss |
| 5,586,613 A | 12/1996 | Ehsani |
| 5,589,743 A | 12/1996 | King |
| 5,607,028 A | 3/1997 | Braun et al. |
| 5,629,567 A | 5/1997 | Kumar |
| 5,629,603 A | 5/1997 | Kinoshita |
| 5,646,510 A | 7/1997 | Kumar |
| 5,669,470 A | 9/1997 | Ross |
| 5,669,842 A | 9/1997 | Schmidt |
| 5,672,920 A | 9/1997 | Donegan et al. |
| 5,679,085 A | 10/1997 | Fredriksen et al. |
| 5,713,425 A | 2/1998 | Buschhaus et al. |
| 5,722,502 A | 3/1998 | Kubo |
| 5,767,584 A | 6/1998 | Gore et al. |
| 5,786,640 A | 7/1998 | Sakai et al. |
| 5,789,882 A | 8/1998 | Ibaraki et al. |
| 5,813,487 A | 9/1998 | Lee et al. |
| 5,813,488 A | 9/1998 | Weiss |
| 5,820,150 A | 10/1998 | Archer et al. |
| 5,820,258 A | 10/1998 | Braun |
| 5,828,554 A | 10/1998 | Donegan et al. |
| 5,847,520 A | 12/1998 | Theurillat et al. |
| 5,865,263 A | 2/1999 | Yamaguchi et al. |
| 5,879,265 A | 3/1999 | Bek |
| 5,880,570 A | 3/1999 | Tamaki et al. |
| 5,881,559 A | 3/1999 | Kawamura |
| 5,895,333 A | 4/1999 | Morisawa et al. |
| 5,924,879 A | 7/1999 | Kameyama |
| 5,925,993 A | 7/1999 | Lansberry |
| 5,927,417 A | 7/1999 | Brunner et al. |
| 5,934,395 A | 8/1999 | Koide et al. |
| 5,939,794 A | 8/1999 | Sakai et al. |
| 5,947,855 A | 9/1999 | Weiss |

(56) References Cited

U.S. PATENT DOCUMENTS

| | | |
|---|---|---|
| 5,957,985 A | 9/1999 | Wong et al. |
| 5,973,463 A | 10/1999 | Okuda et al. |
| 5,980,410 A | 11/1999 | Stemler et al. |
| 5,986,416 A | 11/1999 | Dubois |
| 5,991,683 A | 11/1999 | Takaoka et al. |
| 5,998,880 A | 12/1999 | Kumar |
| 6,005,358 A | 12/1999 | Radev |
| 6,012,004 A | 1/2000 | Sugano et al. |
| 6,028,403 A | 2/2000 | Fukatsu |
| 6,038,500 A | 3/2000 | Weiss |
| 6,054,844 A | 4/2000 | Frank |
| 6,086,074 A | 7/2000 | Braun |
| 6,104,148 A | 8/2000 | Kumar et al. |
| 6,105,984 A | 8/2000 | Schmitz et al. |
| 6,110,066 A | 8/2000 | Nedungadi et al. |
| 6,201,310 B1 | 3/2001 | Adachi et al. |
| 6,298,932 B1 | 10/2001 | Bowman et al. |
| 6,356,817 B1 | 3/2002 | Abe |
| 6,371,878 B1 | 4/2002 | Bowen |
| 6,387,007 B1 | 5/2002 | Fini, Jr. |
| 6,404,607 B1 | 6/2002 | Burgess et al. |
| 6,421,593 B1 | 7/2002 | Kempen et al. |
| 6,434,470 B1 | 8/2002 | Nantz et al. |
| 6,478,705 B1 | 11/2002 | Holmes et al. |
| 6,496,393 B1 | 12/2002 | Patwardhan |
| 6,501,368 B1 | 12/2002 | Wiebe et al. |
| 6,516,914 B1 | 2/2003 | Andersen et al. |
| 6,520,494 B1 | 2/2003 | Andersen et al. |
| 6,553,287 B1 | 4/2003 | Supina et al. |
| 6,553,290 B1 | 4/2003 | Pillar |
| 6,561,718 B1 | 5/2003 | Archer et al. |
| 6,563,230 B2 | 5/2003 | Nada |
| 6,575,866 B2 | 6/2003 | Bowen |
| 6,580,953 B1 | 6/2003 | Wiebe et al. |
| 6,607,466 B2 | 8/2003 | Bordini |
| 6,611,116 B2 | 8/2003 | Bachman et al. |
| 6,702,709 B2 | 3/2004 | Bowen |
| 6,722,458 B2 | 4/2004 | Hofbauer |
| 6,726,592 B2 | 4/2004 | Kotani |
| 6,757,597 B2 | 6/2004 | Yakes et al. |
| 6,764,085 B1 | 7/2004 | Anderson |
| 6,793,600 B2 | 9/2004 | Hiraiwa |
| 6,819,985 B2 | 11/2004 | Minagawa et al. |
| 6,846,257 B2 | 1/2005 | Baker et al. |
| 6,852,053 B2 | 2/2005 | Nakano et al. |
| 6,852,054 B2 | 2/2005 | Tumback et al. |
| 6,860,332 B1 | 3/2005 | Archer et al. |
| 6,882,917 B2 | 4/2005 | Pillar et al. |
| 6,885,920 B2 | 4/2005 | Yakes et al. |
| 6,886,647 B1 | 5/2005 | Gotta |
| 6,909,944 B2 | 6/2005 | Pillar et al. |
| 6,922,615 B2 | 7/2005 | Pillar et al. |
| 6,953,409 B2 | 10/2005 | Schmidt et al. |
| 6,973,600 B2 | 12/2005 | Lau et al. |
| 6,976,688 B2 | 12/2005 | Archer et al. |
| 6,991,054 B2 | 1/2006 | Takaoka et al. |
| 6,993,421 B2 | 1/2006 | Pillar et al. |
| 6,994,646 B2 | 2/2006 | Ai |
| 7,000,717 B2 | 2/2006 | Ai et al. |
| 7,004,868 B2 | 2/2006 | Oshidari et al. |
| 7,006,902 B2 | 2/2006 | Archer et al. |
| 7,024,296 B2 | 4/2006 | Squires et al. |
| 7,053,566 B2 | 5/2006 | Aizawa et al. |
| 7,072,745 B2 | 7/2006 | Pillar et al. |
| 7,073,620 B2 | 7/2006 | Braun et al. |
| 7,073,847 B2 | 7/2006 | Morrow et al. |
| 7,076,356 B2 | 7/2006 | Hubbard et al. |
| 7,086,977 B2 | 8/2006 | Supina et al. |
| 7,107,129 B2 | 9/2006 | Rowe et al. |
| 7,127,331 B2 | 10/2006 | Pillar et al. |
| 7,140,461 B2 | 11/2006 | Morrow |
| 7,154,236 B1 | 12/2006 | Heap |
| 7,162,332 B2 | 1/2007 | Pillar et al. |
| 7,164,977 B2 | 1/2007 | Yakes et al. |
| 7,179,187 B2 | 2/2007 | Raghavan et al. |
| 7,184,862 B2 | 2/2007 | Pillar et al. |
| 7,184,866 B2 | 2/2007 | Squires et al. |
| 7,196,430 B2 | 3/2007 | Yang |
| 7,204,776 B2 | 4/2007 | Minagawa et al. |
| 7,217,211 B2 | 5/2007 | Klemen et al. |
| 7,219,756 B2 | 5/2007 | Bischoff |
| 7,223,200 B2 | 5/2007 | Kojima et al. |
| 7,234,534 B2 | 6/2007 | Froland et al. |
| 7,246,672 B2 | 7/2007 | Shirai et al. |
| 7,254,468 B2 | 8/2007 | Pillar et al. |
| 7,258,194 B2 | 8/2007 | Braun et al. |
| 7,274,976 B2 | 9/2007 | Rowe et al. |
| 7,276,007 B2 | 10/2007 | Takami et al. |
| 7,277,782 B2 | 10/2007 | Yakes et al. |
| 7,282,003 B2 | 10/2007 | Klemen et al. |
| 7,302,320 B2 | 11/2007 | Nasr et al. |
| 7,306,064 B2 | 12/2007 | Imazu et al. |
| 7,322,896 B2 | 1/2008 | Minagawa |
| 7,338,401 B2 | 3/2008 | Klemen et al. |
| 7,357,203 B2 | 4/2008 | Morrow et al. |
| 7,363,996 B2 | 4/2008 | Kamada et al. |
| 7,367,415 B2 | 5/2008 | Oliver et al. |
| 7,367,911 B2 | 5/2008 | Reghavan et al. |
| 7,379,797 B2 | 5/2008 | Nasr et al. |
| 7,392,122 B2 | 6/2008 | Pillar et al. |
| 7,412,307 B2 | 8/2008 | Pillar et al. |
| 7,419,021 B2 | 9/2008 | Morrow et al. |
| 7,439,711 B2 | 10/2008 | Bolton |
| 7,448,460 B2 | 11/2008 | Morrow et al. |
| 7,451,028 B2 | 11/2008 | Pillar et al. |
| 7,462,122 B2 | 12/2008 | Reghavan et al. |
| 7,467,678 B2 | 12/2008 | Tanaka et al. |
| 7,479,080 B2 | 1/2009 | Usoro |
| 7,493,980 B2 | 2/2009 | Hidaka |
| 7,520,354 B2 | 4/2009 | Morrow et al. |
| 7,521,814 B2 | 4/2009 | Nasr |
| 7,522,979 B2 | 4/2009 | Pillar |
| 7,527,573 B2 | 5/2009 | Lang et al. |
| 7,555,369 B2 | 6/2009 | Pillar et al. |
| 7,572,201 B2 | 8/2009 | Supina et al. |
| 7,576,501 B2 | 8/2009 | Okubo et al. |
| 7,597,164 B2 | 10/2009 | Severinsky et al. |
| 7,601,093 B2 | 10/2009 | Tabata et al. |
| 7,635,039 B2 | 12/2009 | Fujiwara et al. |
| 7,678,014 B2 | 3/2010 | Nohara et al. |
| 7,689,332 B2 | 3/2010 | Yakes et al. |
| 7,711,460 B2 | 5/2010 | Yakes et al. |
| 7,715,962 B2 | 5/2010 | Rowe et al. |
| 7,725,225 B2 | 5/2010 | Pillar et al. |
| 7,729,831 B2 | 6/2010 | Pillar et al. |
| 7,749,131 B2 | 7/2010 | Imamura et al. |
| 7,756,621 B2 | 7/2010 | Pillar et al. |
| 7,784,554 B2 | 8/2010 | Grady et al. |
| 7,792,618 B2 | 9/2010 | Quigley et al. |
| 7,811,191 B2 | 10/2010 | Iwase et al. |
| 7,824,293 B2 | 11/2010 | Schimke |
| 7,835,838 B2 | 11/2010 | Pillar et al. |
| 7,848,857 B2 | 12/2010 | Nasr et al. |
| 7,874,373 B2 | 1/2011 | Morrow et al. |
| 7,878,750 B2 | 2/2011 | Zhou et al. |
| 7,888,894 B2 | 2/2011 | Sugawara et al. |
| 7,908,063 B2 | 3/2011 | Sah |
| 7,927,250 B2 | 4/2011 | Imamura et al. |
| 7,931,103 B2 | 4/2011 | Morrow et al. |
| 7,935,021 B2 | 5/2011 | Tabata et al. |
| 7,935,022 B2 | 5/2011 | Iwase et al. |
| 7,937,194 B2 | 5/2011 | Nasr et al. |
| 7,941,259 B2 | 5/2011 | Tabata et al. |
| 7,972,237 B2 | 7/2011 | Ota |
| 8,000,850 B2 | 8/2011 | Nasr et al. |
| 8,007,402 B2 | 8/2011 | Tabata et al. |
| 8,038,572 B2 | 10/2011 | Matsubara et al. |
| 8,062,172 B2 | 11/2011 | Supina et al. |
| 8,068,947 B2 | 11/2011 | Conlon et al. |
| 8,091,662 B2 | 1/2012 | Tolksdorf |
| 8,095,247 B2 | 1/2012 | Pillar et al. |
| 8,123,645 B2 | 2/2012 | Schimke |
| 8,231,491 B2 | 7/2012 | Oba et al. |
| 8,337,352 B2 | 12/2012 | Morrow et al. |

(56) References Cited

U.S. PATENT DOCUMENTS

| | | | |
|---|---|---|---|
| 8,444,517 B2 | 5/2013 | Gradu et al. |
| 8,459,619 B2 | 6/2013 | Trinh et al. |
| 8,491,438 B2 | 7/2013 | Kim et al. |
| 8,561,735 B2 | 10/2013 | Morrow et al. |
| 8,696,506 B2 | 4/2014 | Kaltenbach et al. |
| 8,788,162 B2 | 7/2014 | Park |
| 8,795,113 B2 | 8/2014 | Grochowski et al. |
| 8,801,318 B2 | 8/2014 | Knoble et al. |
| 8,801,567 B2 | 8/2014 | Demirovic et al. |
| 8,818,588 B2 | 8/2014 | Ambrosio et al. |
| 8,864,613 B2 | 10/2014 | Morrow et al. |
| 8,894,526 B2 | 11/2014 | Kozarekar et al. |
| 8,905,892 B1 | 12/2014 | Lee et al. |
| 9,033,836 B2 | 5/2015 | Hiraiwa |
| 9,114,699 B2 | 8/2015 | Takei et al. |
| 9,114,804 B1 | 8/2015 | Shukla et al. |
| 9,132,736 B1 | 9/2015 | Oshkosh |
| 9,376,102 B1 | 6/2016 | Shukla et al. |
| 9,428,042 B2 | 8/2016 | Morrow et al. |
| 9,452,750 B2 | 9/2016 | Shukla et al. |
| 9,492,695 B2 | 11/2016 | Betz et al. |
| 9,504,863 B2 | 11/2016 | Moore |
| 9,579,530 B2 | 2/2017 | Betz et al. |
| 9,580,962 B2 | 2/2017 | Betz et al. |
| 9,650,032 B2 | 5/2017 | Kotloski et al. |
| 9,651,120 B2 | 5/2017 | Morrow et al. |
| 9,656,659 B2 | 5/2017 | Shukla et al. |
| 9,677,334 B2 | 6/2017 | Aiken et al. |
| 9,821,789 B2 | 11/2017 | Shukla et al. |
| 9,908,520 B2 | 3/2018 | Shukla et al. |
| 9,970,515 B2 | 5/2018 | Morrow et al. |
| 10,029,555 B2 | 7/2018 | Kotloski et al. |
| 2002/0005304 A1 | 1/2002 | Bachman et al. |
| 2002/0045507 A1 | 4/2002 | Bowen |
| 2002/0065594 A1 | 5/2002 | Squires et al. |
| 2003/0130765 A1 | 7/2003 | Pillar et al. |
| 2003/0158635 A1 | 8/2003 | Pillar et al. |
| 2003/0163228 A1 | 8/2003 | Pillar et al. |
| 2003/0163230 A1 | 8/2003 | Pillar et al. |
| 2003/0166429 A1 | 9/2003 | Tumback |
| 2003/0171854 A1 | 9/2003 | Pillar et al. |
| 2003/0195680 A1 | 10/2003 | Pillar |
| 2003/0200015 A1 | 10/2003 | Pillar |
| 2003/0230443 A1 | 12/2003 | Cramer et al. |
| 2004/0019414 A1 | 1/2004 | Pillar et al. |
| 2004/0024502 A1 | 2/2004 | Squires et al. |
| 2004/0039510 A1 | 2/2004 | Archer et al. |
| 2004/0040775 A1 | 3/2004 | Shimizu et al. |
| 2004/0055802 A1 | 3/2004 | Pillar et al. |
| 2004/0069865 A1 | 4/2004 | Rowe et al. |
| 2004/0133319 A1 | 7/2004 | Pillar et al. |
| 2004/0133332 A1 | 7/2004 | Yakes et al. |
| 2004/0198551 A1 | 10/2004 | Joe et al. |
| 2004/0199302 A1 | 10/2004 | Pillar et al. |
| 2004/0251862 A1 | 12/2004 | Imai |
| 2005/0004733 A1 | 1/2005 | Pillar et al. |
| 2005/0038934 A1 | 2/2005 | Gotze et al. |
| 2005/0113988 A1 | 5/2005 | Nasr et al. |
| 2005/0113996 A1 | 5/2005 | Pillar et al. |
| 2005/0114007 A1 | 5/2005 | Pillar et al. |
| 2005/0119806 A1 | 6/2005 | Nasr et al. |
| 2005/0131600 A1 | 6/2005 | Quigley et al. |
| 2005/0137042 A1 | 6/2005 | Schmidt et al. |
| 2005/0209747 A1 | 9/2005 | Yakes et al. |
| 2005/0234622 A1 | 10/2005 | Pillar et al. |
| 2005/0252703 A1 | 11/2005 | Schmidt et al. |
| 2006/0046886 A1* | 3/2006 | Holmes .................. B60K 6/387 475/5 |
| 2006/0111213 A1 | 5/2006 | Bucknor et al. |
| 2006/0128513 A1 | 6/2006 | Tata et al. |
| 2006/0189428 A1* | 8/2006 | Raghavan ............. B60K 6/365 475/5 |
| 2006/0223663 A1 | 10/2006 | Bucknor et al. |
| 2006/0276288 A1 | 12/2006 | Iwanaka et al. |
| 2006/0289212 A1 | 12/2006 | Haruhisa |
| 2007/0021256 A1 | 1/2007 | Klemen et al. |
| 2007/0105678 A1 | 5/2007 | Bucknor et al. |
| 2007/0243966 A1 | 10/2007 | Holmes et al. |
| 2007/0254761 A1 | 11/2007 | Kim |
| 2007/0256870 A1 | 11/2007 | Holmes et al. |
| 2007/0275808 A1 | 11/2007 | Iwanaka et al. |
| 2008/0015073 A1* | 1/2008 | Raghavan ............. B60W 20/00 475/5 |
| 2008/0150350 A1 | 6/2008 | Morrow et al. |
| 2008/0200296 A1 | 8/2008 | Holmes |
| 2008/0234087 A1 | 9/2008 | Besnard et al. |
| 2008/0269000 A1 | 10/2008 | Abe et al. |
| 2008/0280726 A1 | 11/2008 | Holmes et al. |
| 2009/0054202 A1 | 2/2009 | Yamakado et al. |
| 2009/0194347 A1 | 8/2009 | Morrow et al. |
| 2009/0209381 A1 | 8/2009 | Ai et al. |
| 2009/0221390 A1 | 9/2009 | Houle |
| 2009/0227409 A1 | 9/2009 | Ito et al. |
| 2009/0227417 A1 | 9/2009 | Imamura et al. |
| 2009/0275437 A1 | 11/2009 | Kersting |
| 2010/0029428 A1 | 2/2010 | Abe et al. |
| 2010/0051361 A1 | 3/2010 | Katsuta et al. |
| 2010/0051367 A1 | 3/2010 | Yamada et al. |
| 2010/0070008 A1 | 3/2010 | Parker et al. |
| 2010/0120579 A1 | 5/2010 | Kawasaki |
| 2010/0121512 A1 | 5/2010 | Takahashi et al. |
| 2010/0137091 A1* | 6/2010 | Park ...................... B60K 6/365 475/5 |
| 2010/0138086 A1 | 6/2010 | Imamura et al. |
| 2010/0145589 A1 | 6/2010 | Kobayashi |
| 2010/0179009 A1 | 7/2010 | Wittkopp et al. |
| 2010/0227722 A1 | 9/2010 | Conlon |
| 2010/0261565 A1 | 10/2010 | Ai et al. |
| 2010/0301668 A1 | 12/2010 | Yakes et al. |
| 2010/0312423 A1 | 12/2010 | Steinhauser et al. |
| 2010/0326752 A1 | 12/2010 | Lamperth |
| 2011/0127095 A1 | 6/2011 | Imamura et al. |
| 2011/0130234 A1 | 6/2011 | Phillips |
| 2011/0143875 A1 | 6/2011 | Ono et al. |
| 2011/0312459 A1 | 12/2011 | Morrow et al. |
| 2011/0319211 A1 | 12/2011 | Si |
| 2012/0022737 A1 | 1/2012 | Kumazaki et al. |
| 2012/0226401 A1 | 9/2012 | Naito |
| 2013/0090202 A1 | 4/2013 | Hiraiwa |
| 2013/0151131 A1 | 6/2013 | Laszio et al. |
| 2013/0196806 A1 | 8/2013 | Morrow et al. |
| 2013/0260936 A1 | 10/2013 | Takei et al. |
| 2013/0296108 A1 | 11/2013 | Ortmann et al. |
| 2014/0094334 A1 | 4/2014 | Tamai et al. |
| 2014/0136035 A1 | 5/2014 | Boskovitch et al. |
| 2014/0141915 A1 | 5/2014 | Naqi et al. |
| 2014/0228168 A1 | 8/2014 | Kaufman et al. |
| 2014/0229043 A1 | 8/2014 | Frank et al. |
| 2014/0235394 A1 | 8/2014 | Smetana et al. |
| 2014/0243149 A1 | 8/2014 | Holmes et al. |
| 2014/0269145 A1 | 9/2014 | Fasana et al. |
| 2014/0288756 A1 | 9/2014 | Tanaka et al. |
| 2014/0303822 A1 | 10/2014 | Kawamura et al. |
| 2014/0335995 A1 | 11/2014 | Swales et al. |
| 2014/0350803 A1 | 11/2014 | Ye et al. |
| 2014/0357441 A1 | 12/2014 | Supina |
| 2014/0358340 A1 | 12/2014 | Radev |
| 2015/0024894 A1 | 1/2015 | Lee et al. |
| 2015/0183436 A1 | 7/2015 | Rekow et al. |
| 2015/0246331 A1 | 9/2015 | Broker et al. |
| 2015/0283894 A1 | 10/2015 | Morrow et al. |
| 2015/0292600 A1 | 10/2015 | Ai et al. |
| 2015/0377327 A1 | 12/2015 | Lee et al. |
| 2016/0133557 A1 | 5/2016 | Mortensen et al. |
| 2016/0288780 A1 | 10/2016 | Shukla et al. |
| 2016/0311253 A1 | 10/2016 | Palmer et al. |
| 2016/0361987 A1 | 12/2016 | Morrow et al. |
| 2017/0008507 A1 | 1/2017 | Shukla et al. |
| 2017/0102059 A1 | 4/2017 | Rekow et al. |
| 2017/0108085 A1 | 4/2017 | Morrow et al. |
| 2017/0246946 A1 | 8/2017 | Morrow et al. |
| 2017/0246947 A1 | 8/2017 | Kotloski et al. |
| 2017/0253229 A1 | 9/2017 | Shukla et al. |
| 2017/0363180 A1 | 12/2017 | Steinberger et al. |

(56) References Cited

U.S. PATENT DOCUMENTS

| | | |
|---|---|---|
| 2017/0370446 A1 | 12/2017 | Steinberger et al. |
| 2018/0023671 A1 | 1/2018 | Watt et al. |
| 2018/0023672 A1 | 1/2018 | Watt et al. |
| 2018/0031085 A1 | 2/2018 | Steinberger et al. |
| 2018/0072303 A1 | 3/2018 | Shukla et al. |
| 2018/0162351 A1 | 6/2018 | Shukla et al. |
| 2018/0222484 A1 | 8/2018 | Shively et al. |
| 2018/0259042 A1 | 9/2018 | Morrow et al. |
| 2018/0326832 A1 | 11/2018 | Kotloski et al. |
| 2018/0345783 A1 | 12/2018 | Morrow et al. |
| 2019/0111910 A1 | 4/2019 | Shukla et al. |
| 2019/0178350 A1 | 6/2019 | Steinberger et al. |
| 2019/0217698 A1 | 7/2019 | Broker et al. |
| 2019/0242460 A1 | 8/2019 | Morrow et al. |

FOREIGN PATENT DOCUMENTS

| | | |
|---|---|---|
| CN | 101318459 A | 12/2008 |
| CN | 101323243 A | 12/2008 |
| CN | 101356070 A | 1/2009 |
| CN | 101631688 A | 1/2010 |
| CN | 103158526 A | 6/2013 |
| CN | 104553731 A | 4/2015 |
| CN | 107405990 | 11/2017 |
| DE | 18 16 183 | 6/1970 |
| DE | 41 08 647 A1 | 9/1992 |
| DE | 41 34 160 A1 | 4/1993 |
| DE | 44 31 929 C1 | 10/1995 |
| DE | 19749074 A1 | 5/1999 |
| DE | 19851436 A1 | 5/2000 |
| DE | 10 2011 109 352 A1 | 2/2013 |
| DE | 2011109352 A1 | 2/2013 |
| DE | 10 2013 006 028 A1 | 10/2014 |
| EP | 0 791 506 A2 | 8/1997 |
| EP | 0 622 264 B1 | 11/1998 |
| EP | 0 898 213 A1 | 2/1999 |
| EP | 0 925 981 A2 | 6/1999 |
| EP | 1 018 451 A1 | 7/2000 |
| EP | 0 805 059 B1 | 8/2000 |
| EP | 1 092 406 A2 | 4/2001 |
| EP | 0 564 943 B1 | 6/2001 |
| EP | 1 142 744 A1 | 10/2001 |
| EP | 0 812 720 B1 | 12/2001 |
| EP | 1 229 636 A2 | 8/2002 |
| EP | 1 340 643 A2 | 9/2003 |
| EP | 0 937 600 B1 | 12/2005 |
| FR | 2658259 A1 | 8/1991 |
| GB | 1 308 318 | 2/1973 |
| GB | 2 302 850 A | 2/1997 |
| GB | 2 346 124 A | 8/2000 |
| GB | 2 400 588 A | 1/2005 |
| GB | 2 400 589 A | 2/2005 |
| GB | 2 400 590 A | 3/2005 |
| JP | 60-216703 A | 10/1985 |
| JP | 2010-070008 A | 4/2010 |
| JP | 2013-112318 A1 | 6/2013 |
| KR | 10-2010-0095073 A | 8/2010 |
| WO | WO-98/19875 A1 | 5/1998 |
| WO | WO-00/30235 A1 | 5/2000 |
| WO | WO-01/54939 A2 | 8/2001 |
| WO | WO-03/055714 A1 | 7/2003 |
| WO | WO-03/093046 A2 | 11/2003 |
| WO | WO-2004/083081 A2 | 9/2004 |
| WO | WO-2004/110849 | 12/2004 |
| WO | WO-2006/028452 | 3/2006 |
| WO | WO-2006/037041 | 4/2006 |
| WO | WO-2006/037098 | 4/2006 |
| WO | WO-2006/037099 | 4/2006 |
| WO | WO-2007/108805 | 9/2007 |
| WO | WO-2011/041549 | 4/2011 |
| WO | WO-2011/163135 | 12/2011 |
| WO | WO-2014/090483 A1 | 6/2014 |
| WO | WO-2014/090486 A1 | 6/2014 |
| WO | WO-2014/102030 A1 | 7/2014 |
| WO | WO-2014/140096 A1 | 9/2014 |
| WO | WO-2014/158078 A1 | 10/2014 |
| WO | WO-2014/166723 A1 | 10/2014 |
| WO | WO-2016/133557 A1 | 8/2016 |
| WO | WO-2016/172250 | 10/2016 |
| WO | WO-2017/007599 | 1/2017 |
| WO | WO-2017/007600 | 1/2017 |
| WO | WO-2017/007600 A1 | 1/2017 |
| WO | WO-2017/070388 | 4/2017 |
| WO | WO-2017/106410 A1 | 6/2017 |
| WO | WO-2019/046758 A1 | 3/2019 |

OTHER PUBLICATIONS

International Preliminary Report on Patentability issued in connection with PCT Appl. Ser. No. PCT/US2021/014649 dated Jul. 26, 2022 (9 pages).
International Search Report and Written Opinion regarding PCT Appl. No. PCT/US2021/014649 dated Mar. 31, 2021, 15 pps.
Bose, et al., "High Frequency AC vs. DC Distribution System for Next Generation Hybrid Electric Vehicle," Industrial Electronics, Control and Instrumentation, Proceedings of the 1996 IEEE IECON 22nd International Conference on Taipei, Taiwan, New York, New York, pp. 706-712 Aug. 5-10, 1996.
The European Search Report based on European Application No. EP 0724300, date of completion of the search Jul. 4, 2005, 2 pages.
Dana Spicer Central Tire Inflation System Specifications, Dana Corporation, Kalamazoo, Michigan, 2 pages, May 2000.
Diesel Locomotive Technology, http://www.railway-technical.com/diesel.shtml, available by Jan. 24, 2012, 15 pages.
International Preliminary Report on Patentability on PCT/US2015/050518, dated Aug. 22, 2017, 11 pages.
International Search Report and Written Opinion on PCT/US2015/050518, dated Feb. 9, 2016, 18 pages.
International Search Report and Written Opinion on PCT/US2016/038586, dated Oct. 21, 2016, 14 pages.
International Search Report and Written Opinion on PCT/US2016/038587, dated Nov. 10, 2016, 15 pages.
International Search Report and Written Opinion on PCT/US2016/057971, dated Jan. 27, 2017, 11 pages.
International Search Report and Written Opinion on PCT/US2018/049158, Dec. 13, 2018, 18 pages.
International Search Report and Written Opinion on PCT/US2018/049550, Dec. 13, 2018, 18 pages.
International Search Report and Written Opinion on PCT/US2018/053983, Jan. 3, 2019, 18 pages.
International Search Report and Written Opinion on PCT/US2019/017854, dated May 10, 2019, 17 pages.
International Search Report for PCT Application No. PCT/US2011/041089, dated Dec. 19, 2011, 6 pages.
Invitation to Pay Additional Fees regarding International Application No. PCT/US2011/041089, mail date Sep. 6, 2011, 5 pages.
Khan, I.A., Automotive Electrical Systems: Architecture and Components, Digital Avionics Systems Conference, IEEE, pp. 8.C.5-1-8.C.5-10, 1999.
Miller, Hybrid Electric Vehicle Propulsion System Architectures of the e-CVI Type, IEEE Transactions on Power Electronics, vol. 21, No. 3, May 2006, 12 pages.
Namuduri, et al., High Power Density Electric Drive for an Hybrid Vehicle, Applied Power Electronics Conference and Exposition, pp. 34-40, Feb. 15, 1998.
Rajashekara, K., History of Electric Vehicles in General Motors, Industry Applications Society Annual Meeting, pp. 447-454, Oct. 2-8, 1993.
Search Report Received for Chinese Application No. 201580076245.5, Oshkosh Corporation, Jan. 2, 2019, 2 pages.
Shigley et al., Theory of Machines and Mechanisms, complete text, McGraw-Hill Book Company, published in the United States, 297 pages, 1980.

* cited by examiner

INLINE ELECTROMECHANICAL VARIABLE TRANSMISSION SYSTEM

CROSS-REFERENCE TO RELATED PATENT APPLICATIONS

This application claims the benefit of U.S. Provisional Patent Application No. 62/964,998, filed Jan. 23, 2020, and is a continuation-in-part of: U.S. application Ser. No. 16/275,059, filed Feb. 13, 2019, which is a continuation-in-part of U.S. application Ser. No. 15/725,154, filed Oct. 4, 2017, which is a continuation-in-part of U.S. application Ser. No. 15/698,415, filed Sep. 7, 2017, which is a continuation-in-part of U.S. application Ser. No. 15/693,176, filed Aug. 31, 2017, which is a continuation-in-part of U.S. application Ser. No. 14/918,221, filed Oct. 20, 2015; U.S. application Ser. No. 15/595,443, filed May 15, 2017, now U.S. Pat. No. 9,970,515, which is a continuation of U.S. application Ser. No. 14/624,285, filed Feb. 17, 2015, now U.S. Pat. No. 9,651,120; U.S. application Ser. No. 15/595,511, filed May 15, 2017, now U.S. Pat. No. 10,029,555, which is a continuation of U.S. application Ser. No. 14/792,532, filed Jul. 6, 2015, now U.S. Pat. No. 9,650,032, which is a continuation-in-part of U.S. application Ser. No. 14/624,285, filed Feb. 17, 2015, now U.S. Pat. No. 9,651,120; and U.S. application Ser. No. 15/601,670, filed May 22, 2017, now U.S. Pat. No. 9,908,520, which is a continuation of U.S. application Ser. No. 14/792,535, filed Jul. 6, 2015, now U.S. Pat. No. 9,656,659, which is a continuation-in-part of U.S. application Ser. No. 14/624,285, filed Feb. 17, 2015, now U.S. Pat. No. 9,651,120, all of which are incorporated herein by reference in their entireties.

BACKGROUND

The present disclosure relates generally to power transmission systems. More specifically, the present disclosure relates to electromechanical variable transmission systems.

Internal combustion engine vehicles, hybrid vehicles, and electric vehicles, among other types of vehicles, include transmissions. Traditional vehicle transmissions use gears and gear trains to provide speed and torque conversions from a rotating power source (e.g., an engine, a motor, etc.) to another device (e.g., a drive shaft, wheels of a vehicle, etc.). Transmissions include multiple gear ratios selectively coupled to the rotating power source with a mechanism. The mechanism may also selectively couple an output to the various gear ratios.

SUMMARY

At least one embodiment relates to a drive system for a vehicle. The drive system includes a first electromagnetic device directly coupled to a first planetary gear set and a second electromagnetic device directly coupled to a second planetary gear set. In a first mode of operation, a clutch is engaged to couple the second planetary gear set to the first planetary gear set and a brake is disengaged to allow rotation of the second planetary gear set and in a second mode of operation, the brake is engaged to limit rotation of the second planetary gear set and the clutch is disengaged.

Another embodiment relates to a drive system for a vehicle. The drive system includes a first electromagnetic device coupled to a first gear set, a second electromagnetic device coupled to a second gear set, an output shaft coupled to the first gear set, wherein the output shaft is configured to transport power from the first electromagnetic device and the second electromagnetic device to a tractive element of the vehicle, a clutch positioned to selectively rotationally couple a sun gear of the second gear set to the first gear set when engaged, and a brake positioned to selectively limit movement of a ring gear of the second gear set when engaged.

Yet another embodiment relates to a vehicle including a multi-mode transmission. The multi-mode transmission includes a first gear set and a second gear set, the second gear set comprising a planetary gear set having a sun gear and a ring gear, wherein the first gear set is directly coupled to the second gear set, a first motor/generator coupled to the first gear set, a second motor/generator coupled to the second gear set, a clutch configured to selectively couple the sun gear to the first gear set when engaged, and a brake configured to selectively limit rotation of the ring gear when engaged. In a first mode of operation, the clutch is engaged to couple the sun gear to the first gear set and the brake is disengaged and in a second mode of operation, the brake is engaged to limit rotation of the ring gear and the clutch is disengaged.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, a multi-mode inline electromechanical variable transmission is provided as part of a vehicle and is selectively reconfigurable between a plurality of operating modes. The vehicle may also include an engine and one or more tractive elements (e.g., wheel and tire assemblies, etc.). The multi-mode inline electromechanical variable transmission may include a first electromagnetic device and a second electromagnetic device. In one embodiment, at least one of the first electromagnetic device and the second electromagnetic device provides rotational mechanical energy to start the engine. In another embodiment, the engine provides a rotational mechanical energy input to both the first and second electromagnetic devices such that each operates as a generator to generate electrical energy. In still other embodiments, the first electromagnetic device and/or the second electromagnetic device are configured to receive a rotational mechanical energy output from the engine and provide an electrical energy output to power a control system and/or the other electromagnetic device or for storage and subsequent use (e.g., to power one or both of the electromagnetic devices). According to an exemplary embodiment, the multi-mode inline electromechanical variable transmission has a compact design that facilitates direct replacement of traditional inline transmissions (e.g., mechanical transmissions, transmissions without electromagnetic devices, etc.) used in front engine applications. Thus, the multi-mode inline electromechanical variable transmission may be installed during a new vehicle construction or installed to replace a conventional transmission of a front engine vehicle (e.g., as opposed to replacing a traditional midship transfer case, etc.). The multi-mode inline electromechanical variable transmission may additionally or alternatively be installed as part of a rear-engine vehicle (e.g., a bus, etc.).

Figure 1:
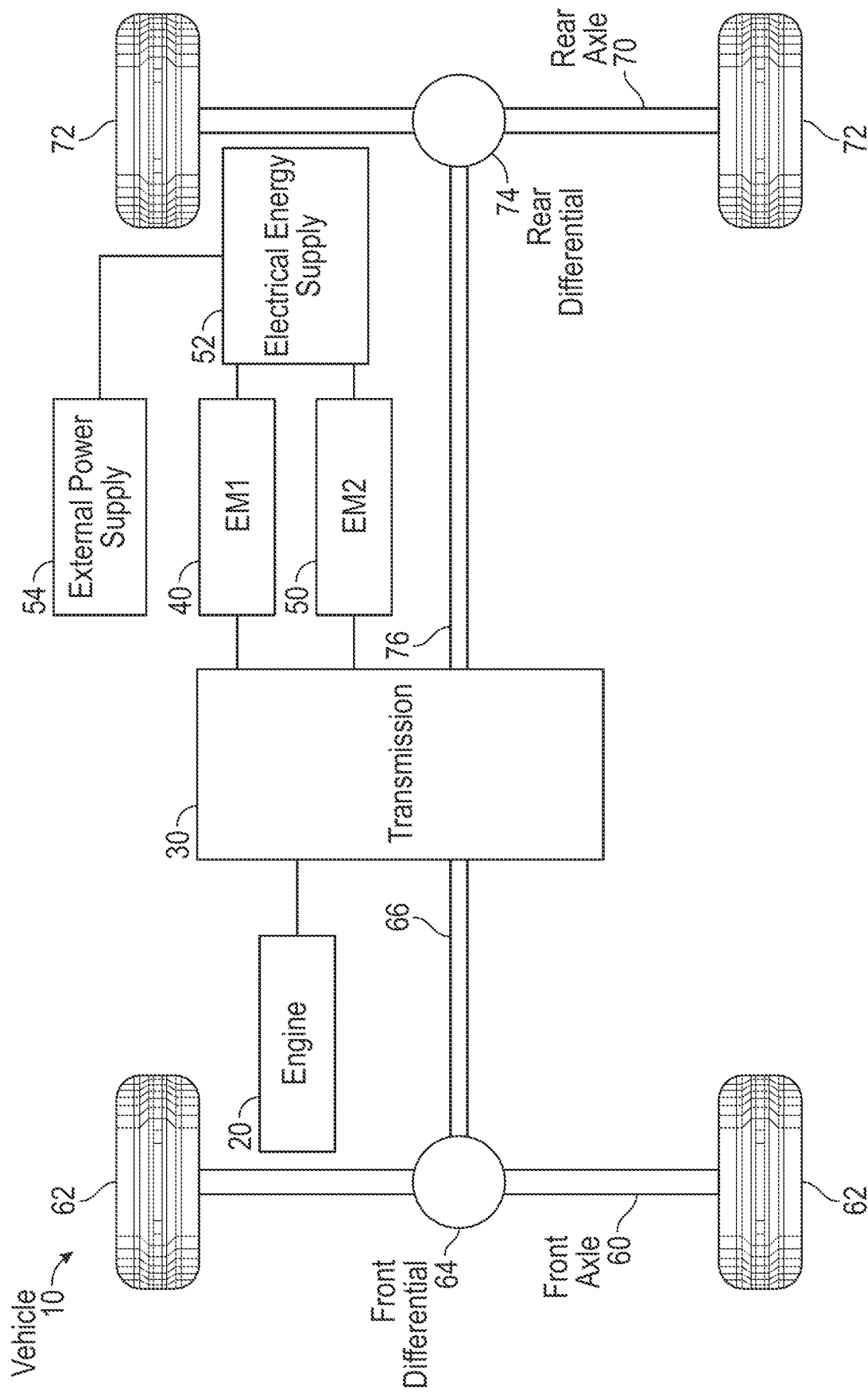
FIG. 1 is a schematic view of a vehicle having a drive train, according to an exemplary embodiment.
Figure 2:
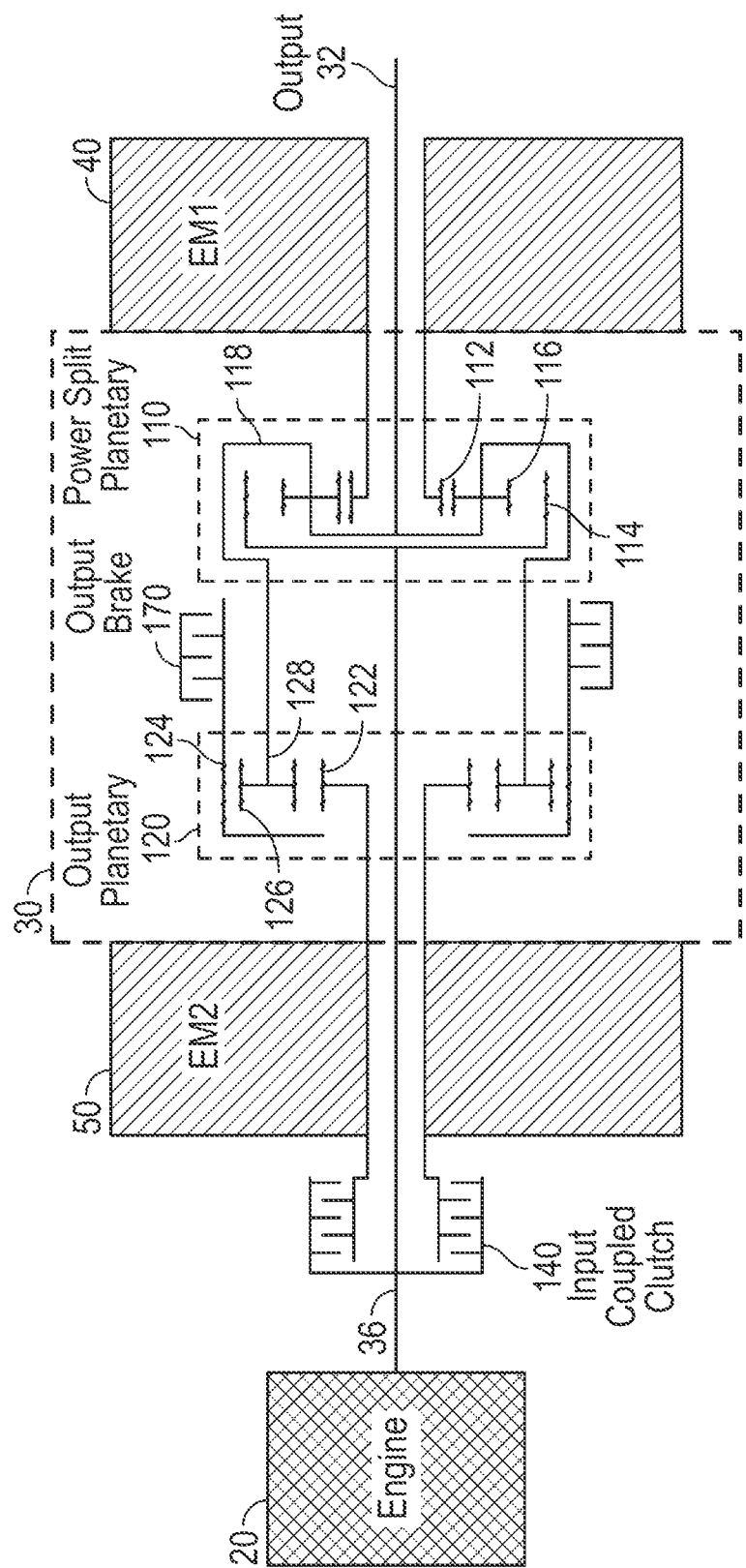
FIG. 2 is a detailed schematic view of a drive train, according to an exemplary embodiment.

According to the exemplary embodiment shown in FIGS. 1 and 2, a vehicle 10 includes an engine 20 coupled to a transmission, shown as transmission 30. In one embodiment, the engine 20 is configured to combust fuel and provide a mechanical energy input to the transmission 30. By way of example, the engine 20 may be configured to provide a rotational mechanical energy input to the transmission 30. As shown in FIGS. 1 and 2, the transmission 30 includes a first electrical machine, electromagnetic device, and/or motor/generator, shown as first electromagnetic device 40, and a second electrical machine, electromagnetic device, and/or motor/generator, shown as second electromagnetic device 50. According to an exemplary embodiment, the vehicle 10 is configured as a rear engine vehicle and the transmission 30 is configured as a multi-mode inline electromechanical transmission. In other embodiments, the vehicle 10 is configured as a mid-engine vehicle or a front engine vehicle.

In some embodiments, an energy storage device, shown as electrical energy supply 52, is disposed onboard the vehicle 10 (e.g., coupled to a chassis of vehicle 10). The electrical energy supply 52 is configured to supply electrical energy to the first electromagnetic device 40 and/or the second electromagnetic device 50 to drive the transmission 30. The electrical energy supply 52 may additionally supply electrical energy to power one or more other devices onboard the vehicle 10 (e.g., lights, electric motors, pumps, compressors, controllers such as controller 210, sensors, etc.). The vehicle 10 may include inverters, converters, voltage regulators, current limiting devices, or other devices configured to condition the electrical power supplied by the electrical energy supply 52 to the various devices of vehicle 10. In other embodiments, the electrical energy supply 52 is omitted from the vehicle 10.

The electrical energy supply 52 may be configured to store and/or generate electrical energy to supply to other components of the vehicle 10. In some embodiments, the electrical energy supply 52 includes one or more battery modules containing one or more individual batteries (e.g., lithium ion batteries, lead acid batteries, nickel-cadmium batteries, etc.) that store energy chemically. The electrical energy supply 52 may include one or more capacitors or supercapacitors. The electrical energy supply 52 may store energy mechanically. By way of example, the electrical energy supply 52 may include a flywheel driven by a motor that stores energy in rotational momentum of the flywheel. The motor may consume electrical energy to drive the flywheel to store energy or slow the flywheel to produce electrical energy. The electrical energy supply 52 may include an energy generation device (e.g., a generator, etc.) driven by a primary driver (e.g., an engine, a motor, etc.). In such an embodiment, the primary driver may receive stored energy in the form of fuel (e.g., gasoline, diesel, etc.) from a fuel tank and combust the fuel to supply mechanical energy to the generation device, thereby producing electrical energy to power the first electromagnetic device 40 and the second electromagnetic device 50. Alternatively, the primary driver may be another type of device (e.g., a fuel cell) that is otherwise powered (e.g., with gasoline, compressed natural gas, hydrogen, electricity, etc.). In yet other embodiments, the electrical energy supply 52 includes another type of energy generation device, such as a solar panel.

The electrical energy supply 52 may be resupplied with stored energy when depleted. By way of example the electrical energy supply 52 may be selectively connected to an external power source or external power supply 54 to recharge the electrical energy supply 52 (e.g., if the electrical energy supply 52 includes a battery or capacitor). The external power supply 54 may supply electrical energy to be stored in the electrical energy supply 52. By way of example, the external power supply 54 may be a power grid, a battery bank, a solar panel, a wind turbine, an energy generation device driven by a primary driver, or another source of electrical energy. The external power supply 54 may be selectively coupled to the electrical energy supply 52 (e.g., with an electrical cord) to supply electrical energy to the electrical energy supply 52 when vehicle 10 is not in operation. Alternatively, in embodiments where the electrical energy supply 52 includes a primary driver and an energy generation device, the electrical energy supply 52 may be resupplied with additional fuel when the fuel in the electrical energy supply 52 is depleted.

The electrical energy supply 52 may be recharged by one or more sources of electrical energy onboard the vehicle 10. By way of example, the first electromagnetic device 40 and/or the second electromagnetic device 50 may be driven (i.e., receive mechanical energy) and produce electrical energy that is subsequently stored in the electrical energy supply 52. The first electromagnetic device 40 and/or the second electromagnetic device 50 may generate electrical energy when applying a braking force on the front axle driveshaft 66 and/or the rear axle driveshaft 76 (e.g., when the vehicle 10 travels down a hill, when stopping the vehicle 10, etc.). Alternatively, the first electromagnetic device 40 and/or the second electromagnetic device 50 may be driven by the engine 20 to generate electrical energy that is subsequently stored in the electrical energy supply 52. In some embodiments, electrical energy produced onboard the vehicle 10 (e.g., by driving first electromagnetic device 40 and/or second electromagnetic device 50) is used directly (e.g., by first electromagnetic device 40 and/or second electromagnetic device 50, by lights or other subsystems of vehicle 10) without the electrical energy being stored.

Referring again to the exemplary embodiment shown in FIG. 1, the vehicle 10 includes a front axle, shown as front axle 60, and a rear axle, shown as rear axle 70. As shown in FIG. 1, the front axle 60 includes a pair of tractive elements, shown as tires 62, coupled to a front differential, shown as front differential 64. The rear axle 70 includes a pair of tractive elements, shown as tires 72, coupled to a rear differential, shown as rear differential 74, according to an exemplary embodiment. According to the exemplary embodiment shown in FIG. 1, the front differential 64 is coupled to the transmission 30 with a front axle driveshaft 66, and the rear differential 74 is coupled to the transmission 30 with a rear axle driveshaft 76. While shown as coupled to the tires 62 and the tires 72, the front differential 64 and the rear differential 74 may be coupled to various other types of tractive elements (e.g., tracks, etc.), according to alternative embodiments. As shown in FIG. 1, the front axle driveshaft 66 and the rear axle driveshaft 76 are configured to transport power from the first electromagnetic device 40, the second electromagnetic device 50, and the engine 20 to the tires 62 and the tires 72, respectively. The vehicle 10 may include a plurality of front differentials 64 that may be coupled and/or a plurality of rear differentials 74 that may be coupled, according to various alternative embodiments. In some embodiments, the transmission 30 is selectively coupled (e.g., via a clutch mechanism, coupling mechanism, etc.) to at least one of the front axle driveshaft 66 and the rear axle driveshaft 76 (e.g., to reconfigure the vehicle 10 into a front-wheel-drive configuration, a rear-wheel-drive configuration, an all-wheel-drive configuration, a four-wheel-drive configuration, etc.).

The engine 20 may be any source of rotational mechanical energy that is derived from a stored energy source. The stored energy source is disposed onboard the vehicle 10, according to an exemplary embodiment. The stored energy source may include a liquid fuel or a gaseous fuel, among other alternatives. In one embodiment, the engine 20 includes an internal combustion engine configured to be powered by at least one of gasoline, natural gas, and diesel fuel. According to various alternative embodiments, the engine 20 includes at least one of a turbine, a fuel cell, and an electric motor, or still another device. According to one exemplary embodiment, the engine 20 includes a twelve liter diesel engine capable of providing between approximately 400 horsepower and approximately 600 horsepower and between approximately 400 foot pounds of torque and approximately 2000 foot pounds of torque. In one embodiment, the engine 20 has a rotational speed (e.g., a rotational operational range, etc.) of between 0 and 2,100 revolutions per minute. The engine 20 may be operated at a relatively constant speed (e.g., 1,600 revolutions per minute, etc.). In one embodiment, the relatively constant speed is selected based on an operating condition of the engine 20 (e.g., an operating speed relating to a point of increased fuel efficiency, etc.).

In one embodiment, at least one of the first electromagnetic device 40 and the second electromagnetic device 50 provide a mechanical energy input to another portion of the transmission 30. By way of example, at least one of the first electromagnetic device 40 and the second electromagnetic device 50 may be configured to provide a rotational mechanical energy input to another portion of the transmission 30 (i.e., at least one of the first electromagnetic device 40 and the second electromagnetic device 50 may operate as a motor, etc.). At least one of the first electromagnetic device 40 and the second electromagnetic device 50 may receive a mechanical energy output from at least one of the engine 20 and another portion of the transmission 30. By way of example, at least one of the first electromagnetic device 40 and the second electromagnetic device 50 may be configured to receive a rotational mechanical energy output from at least one of the engine 20 and another portion of the transmission 30 and provide an electrical energy output (i.e., at least one of the first electromagnetic device 40 and the second electromagnetic device 50 may operate as a generator, etc.). According to an exemplary embodiment, the first electromagnetic device 40 and the second electromagnetic device 50 are capable of both providing mechanical energy and converting a mechanical energy input into an electrical energy output (i.e., selectively operate as a motor and a generator, etc.). The operational condition of the first electromagnetic device 40 and the second electromagnetic device 50 (e.g., as a motor, as a generator, etc.) may vary based on a mode of operation associated with the transmission 30.

According to the exemplary embodiment shown in FIG. 2, a drive system for a vehicle, shown as drive system 100, includes the engine 20, the transmission 30, the first electromagnetic device 40, and the second electromagnetic device 50. The transmission 30 may include the first electromagnetic device 40 and the second electromagnetic device 50. As shown in FIG. 2, the transmission 30 includes a first power transmission device or gear set, shown as power split planetary 110, and a second power transmission device or gear set, shown as output planetary 120. In one embodiment, the power split planetary 110 and the output planetary 120 are positioned outside of (e.g., on either side of, sandwiching, not between, etc.) the first electromagnetic device 40 and the second electromagnetic device 50. As shown in FIG. 2, one or both of the power split planetary 110 and the output planetary 120 are disposed between (e.g., sandwiched by, etc.) the first electromagnetic device 40 and the second electromagnetic device 50.

Referring to the exemplary embodiment shown in FIG. 2, the power split planetary 110 is a planetary gear set that includes a sun gear 112, a ring gear 114, and a plurality of planetary gears 116. The plurality of planetary gears 116 couple the sun gear 112 to the ring gear 114, according to an exemplary embodiment. As shown in FIG. 2, a carrier 118 rotationally supports the plurality of planetary gears 116. In one embodiment, the first electromagnetic device 40 is directly coupled to the sun gear 112 such that the power split planetary 110 is coupled to the first electromagnetic device 40. By way of example, the first electromagnetic device 40 may include or be coupled to a shaft (e.g., a first shaft, an input shaft, an output shaft, etc.) directly coupled to the sun gear 112.

Referring still to the exemplary embodiment shown in FIG. 2, the output planetary 120 is a planetary gear set that includes a sun gear 122, a ring gear 124, and a plurality of planetary gears 126. The plurality of planetary gears 126 couple the sun gear 122 to the ring gear 124, according to an exemplary embodiment. As shown in FIG. 2, a carrier 128 rotationally supports the plurality of planetary gears 126. In one embodiment, the second electromagnetic device 50 is directly coupled to the sun gear 122 such that the output planetary 120 is coupled to the second electromagnetic device 50. By way of example, the second electromagnetic device 50 may include or be coupled to a shaft (e.g., a second shaft, an input shaft, an output shaft, etc.) directly coupled to the sun gear 122. The carrier 118 is directly coupled to the carrier 128, thereby coupling the power split planetary 110 to the output planetary 120, according to the exemplary embodiment shown in FIG. 2. In one embodiment, directly coupling the carrier 118 to the carrier 128 synchronizes the rotational speeds of the carrier 118 and the carrier 128.

The carrier 118 is directly rotationally coupled to an output with a shaft, shown as output shaft 32, according to the exemplary embodiment shown in FIG. 2. The output shaft 32 may be coupled to at least one of the rear axle driveshaft 76 and the front axle driveshaft 66. By way of example, the output shaft 32 may be coupled to a transfer case and/or the rear axle driveshaft 76 where the transmission 30 is installed in place of a traditional, mechanical, straight-thru transmission. In another embodiment, the output is a PTO output, and the output shaft 32 is coupled thereto. A clutch assembly may be engaged and disengaged to selectively couple at least one of the front axle driveshaft 66, a transfer case, and the rear axle driveshaft 76 to the output shaft 32 of the transmission 30 (e.g., to facilitate operation of a vehicle in a rear-wheel-drive mode, an all-wheel-drive mode, a four-wheel-drive mode, a front-wheel-drive mode, etc.). As shown in FIG. 2, the transmission 30 includes a shaft, shown as connecting shaft 36, coupling the engine to the power split planetary 110. According to an exemplary embodiment, the connecting shaft 36 directly couples the engine 20 to the power split planetary 110. In one embodiment, the connecting shaft 36 directly couples the engine 20 with the ring gear 114 of the power split planetary 110.

As shown in FIG. 2, the transmission 30 includes a clutch, shown as input coupled clutch 140. The input coupled clutch 140 is positioned to selectively couple the second electromagnetic device 50 with the engine 20, according to an exemplary embodiment. The input coupled clutch 140 may thereby selectively couple the engine 20 to the output planetary 120. As shown in FIG. 2, the connecting shaft 36 extends from the engine 20, through the input coupled clutch 140 and the second electromagnetic device 50, and through the output planetary 120 to the power split planetary 110. The input coupled clutch 140 may selectively couple the second electromagnetic device 50 with the connecting shaft 36. Accordingly, the input coupled clutch 140 may selectively couple the connecting shaft 36 to the sun gear 122 of the output planetary 120. According to an exemplary embodiment, the first electromagnetic device 40 and the second electromagnetic device 50 (e.g., input/output shafts thereof, etc.) are aligned (e.g., radially aligned, etc.) with the power split planetary 110, the output planetary 120, the connecting shaft 36, and/or the output shaft 32 (e.g., centerlines thereof are aligned, to thereby form a straight-thru or inline transmission arrangement, etc.). In some embodiments, the connecting shaft 36 is aligned with an output of the engine 20 (e.g., an input/output shaft thereof). In some embodiments, the entirety of the connecting shaft 36 is radially aligned with a single axis (e.g., the connecting shaft 36 is straight and continuous). In other embodiments, the connecting shaft 36 may include multiple portions or sections, some of which are not radially aligned with one another. By way of example, such portions of the connecting shaft 36 may be coupled to one another through one or more universal joints. In some embodiments, at least one portion of the connecting shaft 36 may be radially aligned with the first electromagnetic device 40, the second electromagnetic device 50, the power split planetary 110, the output planetary 120, and/or the output shaft 32.

Referring again to the exemplary embodiment shown in FIG. 2, the transmission 30 includes a brake, shown as output brake 170. The output brake 170 is positioned to selectively inhibit the movement of at least a portion of the output planetary 120 (e.g., the ring gear 124, etc.), according to an exemplary embodiment. By way of example, the output brake 170 may inhibit movement of at least a portion of the output planetary 120 relative to a housing of the transmission 30 (e.g., a housing coupled to a chassis of the vehicle 10).

In some embodiments, the input coupled clutch 140 is biased into a disengaged position (e.g., with a spring, etc.) and selectively engaged (e.g., with application of pressurized hydraulic fluid, etc.). In some embodiments, the output brake 170 is biased into a disengaged position (e.g., with a spring, etc.) and selectively engaged (e.g., with application of pressurized hydraulic fluid, etc.). In other embodiments, the input coupled clutch 140 and/or the output brake 170 are hydraulically-biased and spring released. In still other embodiments, the components of the transmission 30 are still otherwise engaged and disengaged (e.g., pneumatically, etc.). By way of example, the output brake 170 and the input coupled clutch 140 may be engaged simultaneously, such that the rotational speeds of the connecting shaft 36, the first electromagnetic device 40, the second electromagnetic device 50, and/or the output shaft 32 are synchronized.

In some embodiments, the power split planetary 110 and the output planetary 120 are rotationally coupled through the connection between the carrier 118 and the carrier 128. In some embodiments, the power split planetary 110 and the output planetary are rotationally coupled (e.g., selectively rotationally coupled) through the sun gear 122, the second electromagnetic device 50, the input coupled clutch 140, the connecting shaft 36, and the ring gear 114. In some embodiments, the power split planetary 110 and the output planetary 120 are rotationally coupled only through (a) the connection between the carrier 118 and the carrier 128 and/or (b) the sun gear 122, the second electromagnetic device 50, the input coupled clutch 140, the connecting shaft 36, and the ring gear 114. In some embodiments, each component that couples the power split planetary 110 with the output planetary 120 is radially aligned with the first electromagnetic device 40, the second electromagnetic device 50, the connecting shaft 36, the power split planetary 110, the output planetary 120, and/or the output shaft 32. By way of example, the power split planetary 110 and the output planetary 120 may not be rotationally coupled by a shaft that is radially offset from the first electromagnetic device 40, the second electromagnetic device 50, the connecting shaft 36, the power split planetary 110, the output planetary 120, and/or the output shaft 32.

Figure 3:
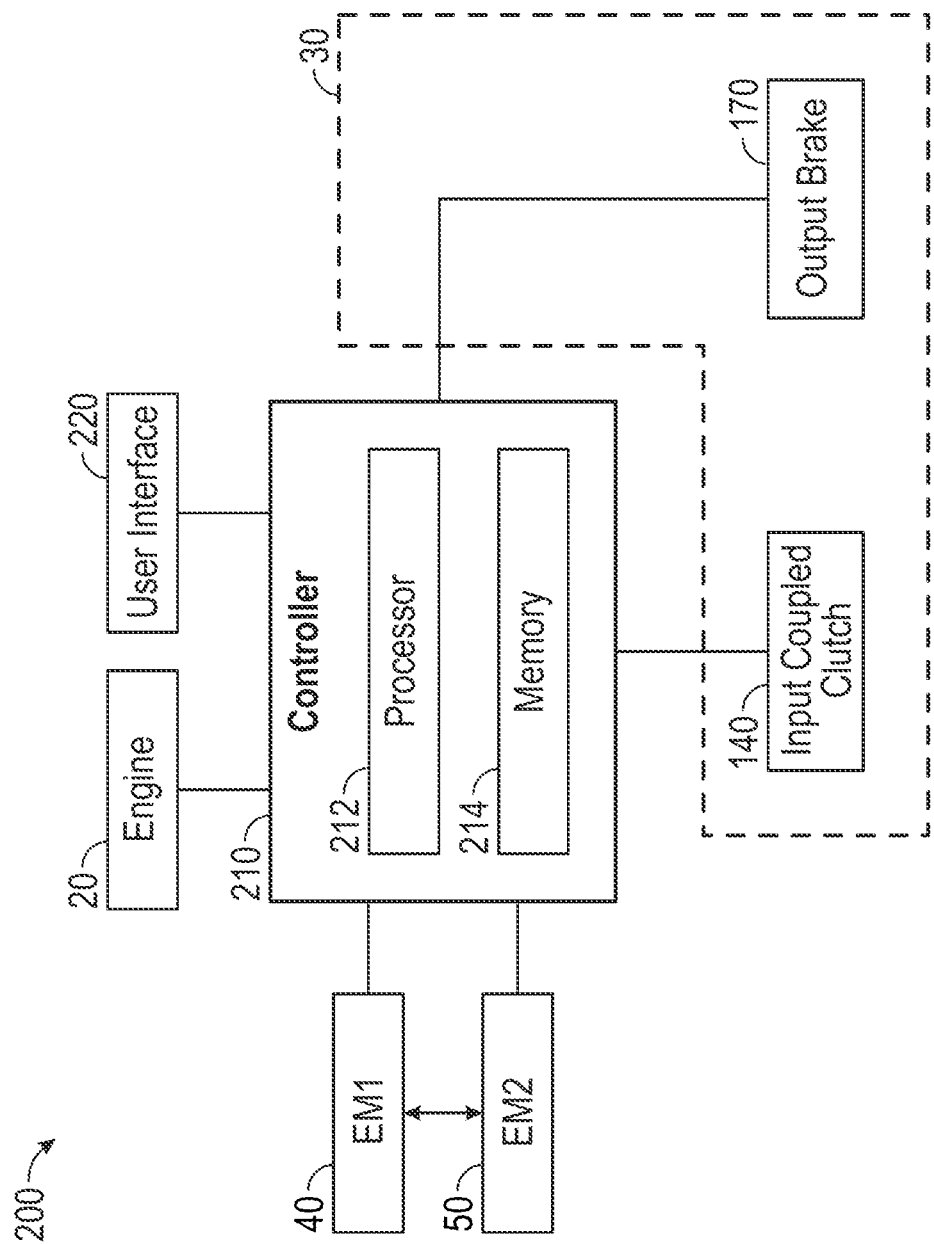
FIG. 3 is a schematic diagram of a control system for a drive train, according to an exemplary embodiment.

According to the exemplary embodiment shown in FIG. 3, a control system 200 for a vehicle (e.g., the vehicle 10, etc.) includes a controller 210. In one embodiment, the controller 210 is configured to selectively engage, selectively disengage, or otherwise communicate with components of the vehicle according to various modes of operation. As shown in FIG. 3, the controller 210 is coupled to the engine 20. In one embodiment, the controller 210 is configured to selectively engage the engine 20 (e.g., interface with a throttle thereof, etc.) such that an output of the engine 20 rotates at a target rate. The controller 210 is coupled to the first electromagnetic device 40 and the second electromagnetic device 50, according to an exemplary embodiment, and may send and receive signals therewith. By way of example, the controller 210 may send command signals relating to at least one of a target mode of operation, a target rotational speed, and a target rotation direction for the first electromagnetic device 40 and the second electromagnetic device 50. As shown in FIG. 3, the first electromagnetic device 40 and the second electromagnetic device 50 are electrically coupled (e.g., by an electrical power transmission system, etc.). By way of example, power generated by the first electromagnetic device 40 may be utilized by the second electromagnetic device 50 (e.g., to provide an output torque as a motor, etc.), or power generated by the second electromagnetic device 50 may be utilized by the first electromagnetic device 40 (e.g., to provide an output torque as a motor, etc.). The controller 210 is configured to selectively engage and selectively disengage the input coupled clutch 140 and the output brake 170 directly or by interacting with another component (e.g., a pump, a valve, a solenoid, a motor, etc.).

According to the exemplary embodiment shown in FIG. 3, the controller 210 includes a processor 212 and a memory device or memory 214. In some embodiments, the processor 212 is configured to execute computer code stored in the memory 214 to facilitate the activities described herein. The memory 214 includes various actuation profiles corresponding to modes of operation (e.g., for the transmission 30, for the drive system 100, for a vehicle, etc.), according to an exemplary embodiment.

In some modes of operation, the drive system 100 may be configured to operate with the first electromagnetic device 40 and the second electromagnetic device 50, and no additional sources of electrical power. Additional sources of electrical power include, for example, a battery and other energy storage devices. Without an energy storage device, the first electromagnetic device 40 and the second electromagnetic device 50 may operate in power balance. One of the electromagnetic devices may provide all of the electrical power required by the other electromagnetic device (as well as the electrical power required to offset power losses). The first electromagnetic device 40 and the second electromagnetic device 50 may operate without doing either of (a) providing electrical power to an energy storage device or (b) consuming electrical power from an energy storage device. Thus, the sum of the electrical power produced or consumed by the first electromagnetic device 40, the electrical power produced or consumed by the second electromagnetic device 50, and electrical power losses may be zero. According to the embodiment of FIGS. 1-3, two electromagnetic devices are shown. In other embodiments, the system includes three or more electromagnetic devices.

According to the exemplary embodiment shown in FIG. 3, the control system 200 includes a user interface 220 that is coupled to the controller 210. In one embodiment, the user interface 220 includes a display and an operator input. The display may be configured to display a graphical user interface, an image, an icon, or still other information. In one embodiment, the display includes a graphical user interface configured to provide general information about the vehicle (e.g., vehicle speed, fuel level, warning lights, etc.). The graphical user interface may be configured to also display a current mode of operation, various potential modes of operation, or still other information relating to the transmission 30 and/or the drive system 100. By way of example, the graphical user interface may be configured to provide specific information regarding the operation of the drive system 100 (e.g., whether the input coupled clutch 140, output coupled clutch 150 and/or the output brake 170 are engaged or disengaged, a fault condition where at least one of the input coupled clutch 140 or the output brake 170 fail to engage or disengage in response to a command signal, etc.).

The operator input may be used by an operator to provide commands to at least one of the engine 20, the transmission 30, the first electromagnetic device 40, the second electromagnetic device 50, and the drive system 100 or still another component of the vehicle. The operator input may include one or more buttons, knobs, touchscreens, switches, levers, or handles. In one embodiment, an operator may press a button to change the mode of operation for at least one of the transmission 30, and the drive system 100, and the vehicle. The operator may be able to manually control some or all aspects of the operation of the transmission 30 using the display and the operator input. It should be understood that any type of display or input controls may be implemented with the systems and methods described herein.

Referring next to the exemplary embodiments shown in FIGS. 4-8, the transmission 30 is configured to operate according to a plurality of modes of operation. Various modes of operation for the transmission 30 are identified below in Table 1. In other embodiments, a vehicle having the transmission 30 is configured to operate according to the various modes of operation shown in FIGS. 4-8 and identified below in Table 1.

TABLE 1

| Mode of Operation | Output Brake 170 | Input Coupled Clutch 140 |
| --- | --- | --- |
| Reverse | X | |
| Power Generation | | X |
| Neutral/Vehicle Start | | |
| Low Range | X | |
| High Range | | X |

As shown in Table 1, an "X" represents a component of the drive system 100 (e.g., the output brake 170, the input coupled clutch 140, etc.) that is engaged or closed during the respective modes of operation.

Figure 4:
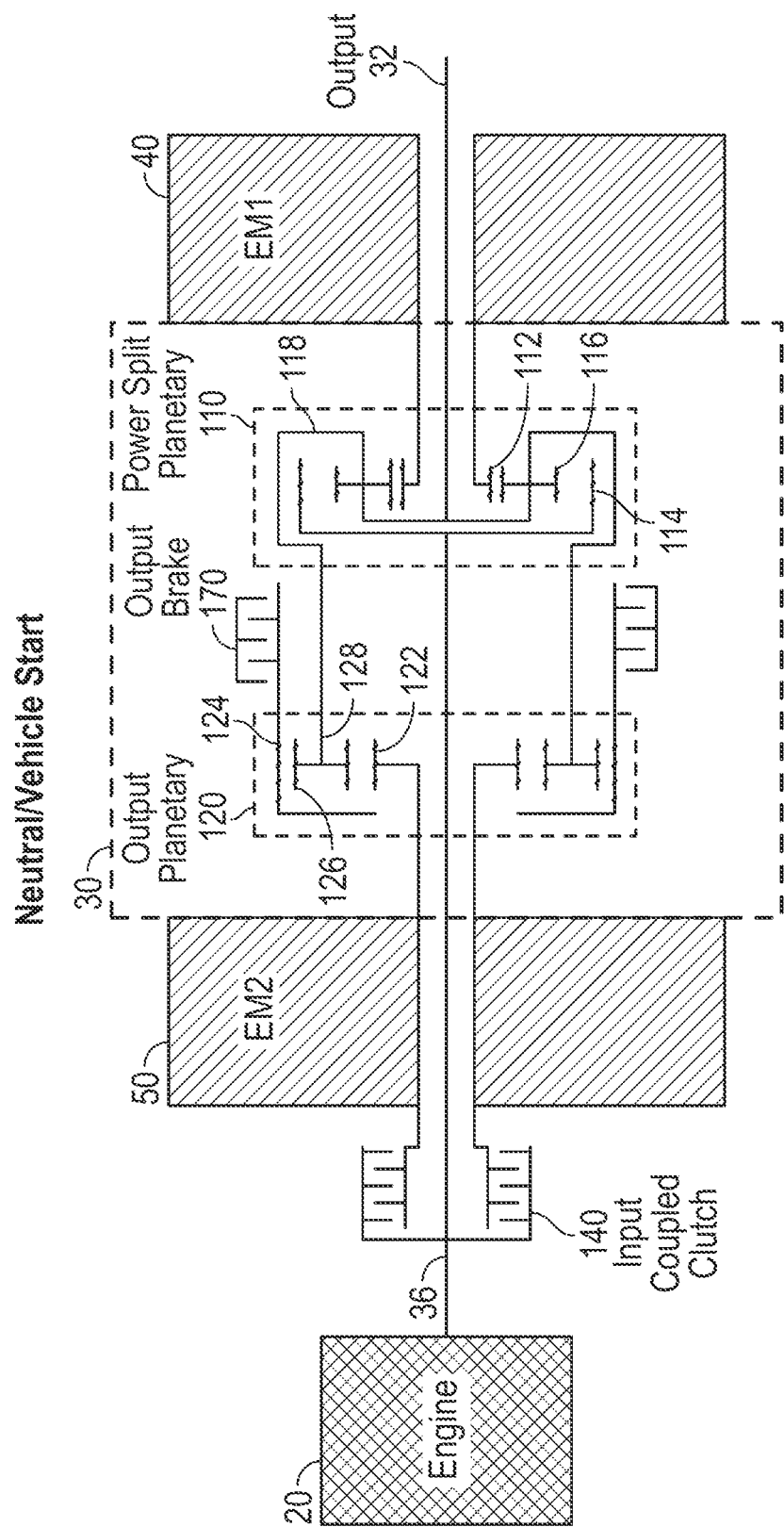
FIG. 4 is a detailed schematic view of the drive train of FIG. 2 configured in a neutral/startup mode of operation.

As shown in FIG. 4, the transmission 30 is selectively reconfigured into a neutral/vehicle start or startup mode. The neutral/startup mode may provide a true neutral for the transmission 30. By way of example, in the neutral/startup mode, the connecting shaft 36 may be driven (e.g., by the engine 20) without driving the output shaft 32. By way of another example, in the neutral/startup mode, the output shaft 32 may be driven (e.g., by an outside force driving the tires 72, such as when the vehicle 10 is rolled down a hill, etc.) without driving the connecting shaft 36 or the engine 20. By way of another example, the second electromagnetic device 50 may be rotated without driving the first electromagnetic device 40, the connecting shaft 36, or the output shaft 32. The neutral/startup mode may be used when towing the vehicle 10 without backdriving the engine 20.

In one embodiment, at least one of the first electromagnetic device 40 and the second electromagnetic device 50 include and/or are coupled to an energy storage device (e.g., a capacitor, a battery, etc.) configured to store energy (e.g., electrical energy, chemical energy, etc.) associated with drive system 100. In one embodiment, rotation of the first electromagnetic device 40 rotates the connecting shaft 36 to start the engine 20. By way of example, if rotation of the output shaft 32 is inhibited (e.g., by a driveline brake, by resistance to movement of the vehicle 10, etc.), rotational mechanical energy may pass from the first electromagnetic device 40, through the sun gear 112, through the plurality of planetary gears 116 and the ring gear 114 to the engine 20. The first electromagnetic device 40 or the second electromagnetic device 50 may be configured to use the stored energy to start the engine 20 by providing a rotational mechanical energy input (e.g., a torque, etc.) to the engine 20 through the connecting shaft 36.

In an alternative embodiment, the engine 20 includes a traditional starting mechanism (e.g., a starter motor, etc.) configured to start the engine 20 (e.g., in response to a vehicle start request, in response to an engine start request, etc.). The vehicle start request and/or the engine start request may include a directive to turn the engine "on" from an "off" state. The vehicle may include at least one of a pushbutton, a graphical user interface, an ignition, and another device with which a user interacts to provide or trigger the vehicle start request and/or the engine start request.

In the neutral/startup mode, the engine 20 may provide a rotational mechanical energy input to the first electromagnetic device 40 (e.g., if rotation of the output shaft 32 is inhibited, etc.). The first electromagnetic device 40 may be brought up to a threshold (e.g., a threshold speed, a threshold speed for a target period of time, a threshold power generation, a threshold power generation for a target period of time, etc.) that establishes a requisite DC bus voltage for controlling the first electromagnetic device 40 and/or the second electromagnetic device 50. Both the first electromagnetic device 40 and the second electromagnetic device 50 may thereafter be activated and controlled within and/or to desired states. The power electronics of the control system 200 that control the motor-to-motor functions may be brought online during the neutral/startup mode.

As shown in FIG. 4 and Table 1, the input coupled clutch 140 and the output brake 170 are disengaged when the transmission 30 is configured in the neutral/startup mode. In some embodiments, disengaging the input coupled clutch 140 and the output brake 170 may not prevent rotation of the output shaft 32 and may thereby not eliminate a forward lurch potential of the vehicle 10.

According to an exemplary embodiment, an energy flow path in the neutral/startup mode includes: the first electromagnetic device 40 providing a rotational mechanical energy input to the sun gear 112 that is received by the plurality of planetary gears 116; the plurality of planetary gears 116 rotating about central axes thereof (e.g., planetary gears 116 may not rotate about the sun gear 112 because the carrier 118 may be rotationally fixed, such as by a brake on the output shaft 32, etc.); the plurality of planetary gears 116 conveying the rotational mechanical energy to the ring gear 114; the ring gear 114 transferring the rotational mechanical energy to the engine 20 through the connecting shaft 36 such that the rotational mechanical energy provided by the first electromagnetic device 40 starts the engine 20.

An alternative energy flow path in the neutral/startup mode may include starting the engine 20 with a traditional starting mechanism, the engine 20 providing a rotational mechanical energy input through the connecting shaft 36 to the ring gear 114 that is received by the plurality of planetary gears 116; the plurality of planetary gears 116 rotating about central axes thereof (e.g., planetary gears 116 may or may not rotate about the sun gear 112 because the carrier 118 may or may not be rotationally fixed, etc.); the plurality of planetary gears 116 conveying the rotational mechanical energy to the sun gear 112; and the sun gear 112 conveying the rotational mechanical energy to the first electromagnetic device 40 to bring the first electromagnetic device 40 up to the threshold for establishing a requisite bus voltage and controlling the first electromagnetic device 40 and/or the second electromagnetic device 50 in a desired state. By way of example, the neutral/startup mode may be used to start the engine 20, establish a requisite bus voltage, or otherwise export power without relying on the controller 210 to engage the first electromagnetic device 40 and/or the second electromagnetic device 50. The transmission 30 may provide increased export power potential relative to traditional transmission systems.

Figure 5:
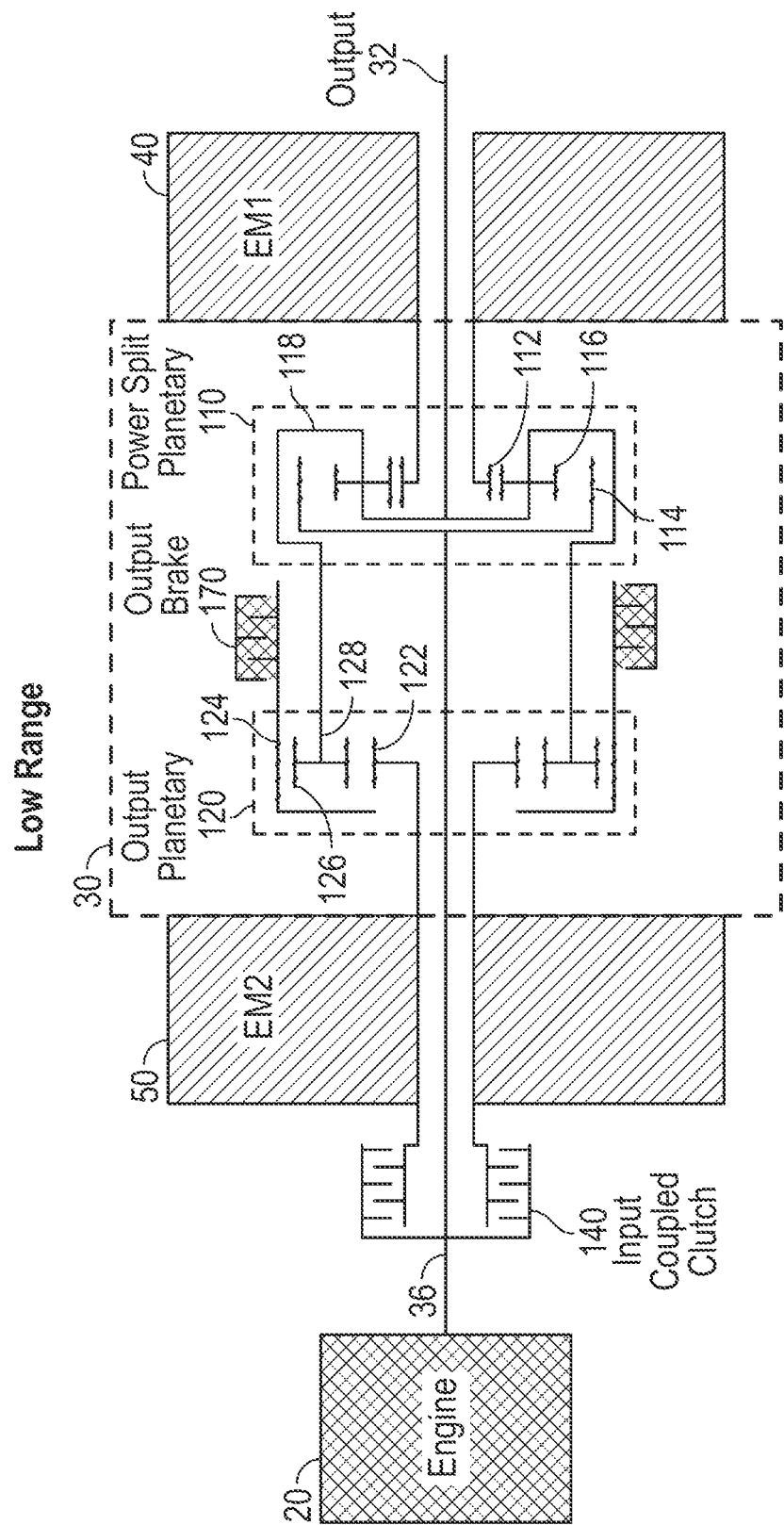
FIG. 5 is a detailed schematic view of the drive train of FIG. 2 configured in a low range mode of operation.

As shown in FIG. 5, the transmission 30 is selectively reconfigured into a low range mode of operation such that the transmission 30 allows for a low output speed operation with a high output torque (e.g., in a forward direction of travel, etc.). The low range mode increases a vehicle's gradability (e.g., facilitates the vehicle maintaining speed on a grade, etc.). In one embodiment, the engine 20 provides a rotational mechanical energy input to the transmission 30 such that the first electromagnetic device 40 generates electrical power and the second electromagnetic device 50 uses the generated electrical power to provide a rotational mechanical energy output. As such, at least one of the engine 20 and the second electromagnetic device 50 provide a rotational mechanical energy input to drive at least one of the tires 62 and the tires 72. In an alternative embodiment, the first electromagnetic device 40 operates as a motor and the second electromagnetic device 50 operates as a generator when the transmission 30 is configured in the low range forward mode. In still another alternative embodiment, both the first electromagnetic device 40 and the second electromagnetic device 50 operate as a generator in the low range forward mode. In yet another embodiment, both the first electromagnetic device 40 and the second electromagnetic device 50 operate as motors in the low range mode. In such an embodiment, the first electromagnetic device 40 and/or the second electromagnetic device 50 may use stored electrical power (e.g., from an energy storage device, such as the electrical energy supply 52) or electrical power generated by another device (e.g., a solar panel).

As shown in FIG. 5 and Table 1, the output brake 170 is engaged when the transmission 30 is configured in the low range mode. As shown in FIG. 5, the output brake 170 rotationally fixes the ring gear 124. In one embodiment, engaging the output brake 170 substantially eliminates a power dip between output and input modes of the transmission 30. According to the exemplary embodiment shown in FIG. 5, an energy flow path for the low range forward mode includes: the engine 20 providing a rotational mechanical energy input to the connecting shaft 36 that is conveyed to the ring gear 114; the ring gear 114 driving the plurality of planetary gears 116 to rotate about central axes thereof, as well as about the sun gear 112 such that both the carrier 118 and the sun gear 112 rotate; and the rotation of the carrier 118 driving the output shaft 32.

With the ring gear 124 fixed by the output brake 170, the second electromagnetic device 50 may operate as a motor. In one embodiment, the second electromagnetic device 50 receives electrical energy generated by the first electromagnetic device 40. The first electromagnetic device 40 operates as a generator, removing a rotational mechanical energy from the sun gear 112. The sun gear 122 conveys rotational mechanical torque from the second electromagnetic device 50 to the plurality of planetary gears 126 such that each further rotates about the sun gear 122 (e.g., at an increased rotational speed, etc.). The rotation of the plurality of planetary gears 126 (e.g., effected by the sun gear 122, etc.) drives the carrier 128 and thereby the carrier 118. The carrier 118 drives the output shaft 32 at a low range output speed and may thereby drive a vehicle at a low range output speed.

Figure 6:
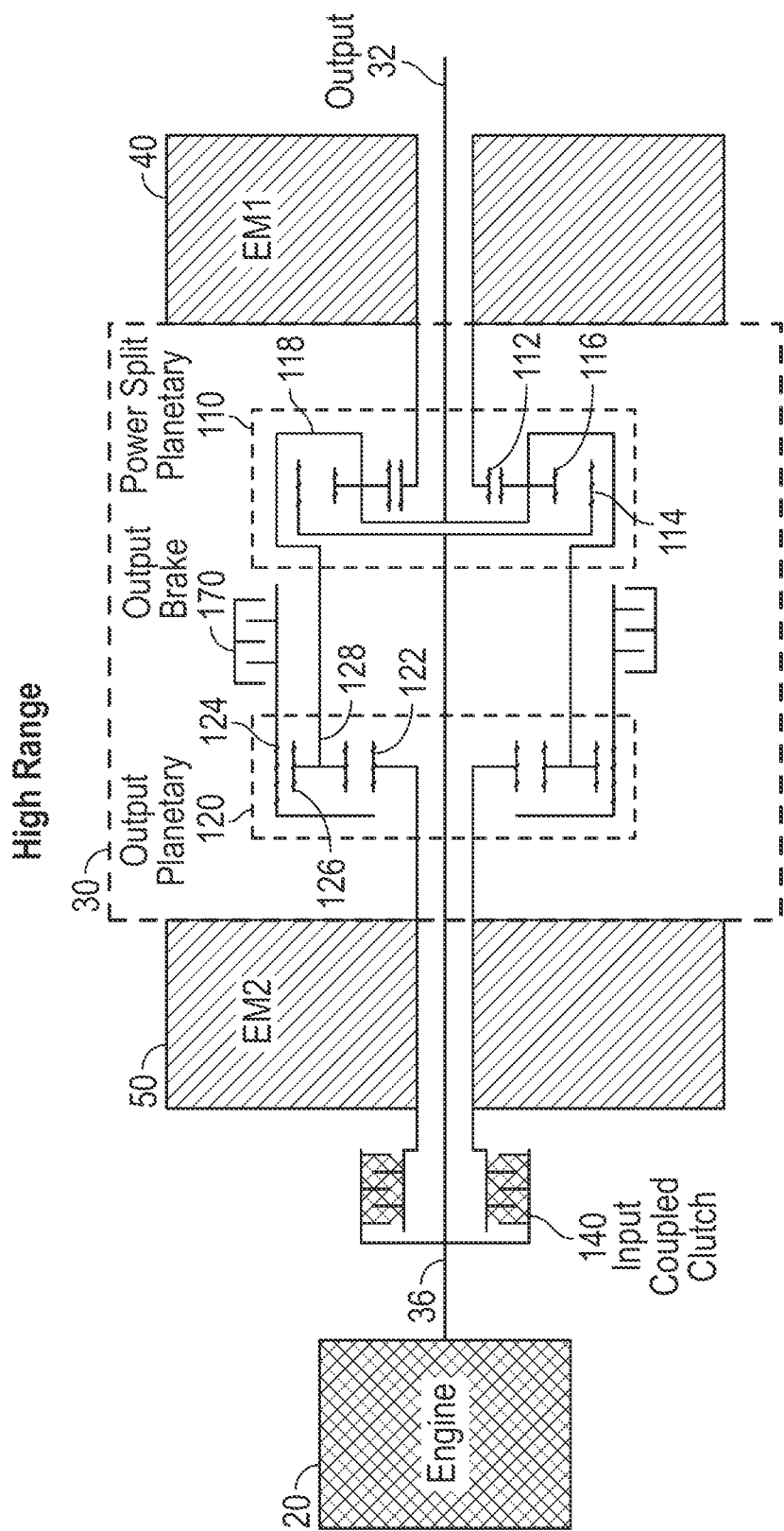
FIG. 6 is a detailed schematic view of the drive train of FIG. 2 configured in a high range mode of operation.

As shown in FIG. 6, the transmission 30 is selectively reconfigured into a high range mode of operation such that the transmission 30 allows for a high output speed operation (e.g., in a forward direction of travel, etc.). In one embodiment, the engine 20 provides a rotational mechanical energy input such that the second electromagnetic device 50 generates electrical power while the first electromagnetic device 40 uses the generated electrical power to provide a rotational mechanical energy output. As such, at least one of the engine 20 and the first electromagnetic device 40 provide rotational mechanical energy to drive at least one of the tires 62 and the tires 72. In an alternative embodiment, the first electromagnetic device 40 operates as a generator and the second electromagnetic device 50 operates as a motor when the transmission 30 is configured in the high range mode. In yet another embodiment, both the first electromagnetic device 40 and the second electromagnetic device 50 operate as motors when the transmission 30 is configured in the high range mode. In still another alternative embodiment, both the first electromagnetic device 40 and the second electromagnetic device 50 operate as a generator in the high range mode.

As shown in FIG. 6 and Table 1, the input coupled clutch 140 is engaged when the transmission 30 is configured in the high range mode. As shown in FIG. 6, the engagement of the input coupled clutch 140 with the connecting shaft 36 rotationally couples the engine 20 and the second electromagnetic device 50. By way of example, the engine 20 may provide a rotational mechanical energy input to the connecting shaft 36 such that the second electromagnetic device 50 generates electrical energy. In one embodiment, the first electromagnetic device 40 receives the electrical energy generated by the second electromagnetic device 50. The first electromagnetic device 40 operates as a motor, providing a rotational mechanical energy input to the sun gear 112 that drives the plurality of planetary gears 116 and the carrier 118.

Referring still to FIG. 6, power from the engine 20 is transferred to the ring gear 114 and the plurality of planetary gears 116. The plurality of planetary gears 116 are driven by at least one of the engine 20 (e.g., via the ring gear 114, etc.) and the first electromagnetic device 40 (e.g., via the sun gear 112, etc.). The carrier 118 rotates, which drives the output shaft 32 such that the rotational mechanical energy provided by the engine 20 and the first electromagnetic device 40 drives a vehicle at a high range speed.

Figure 7:
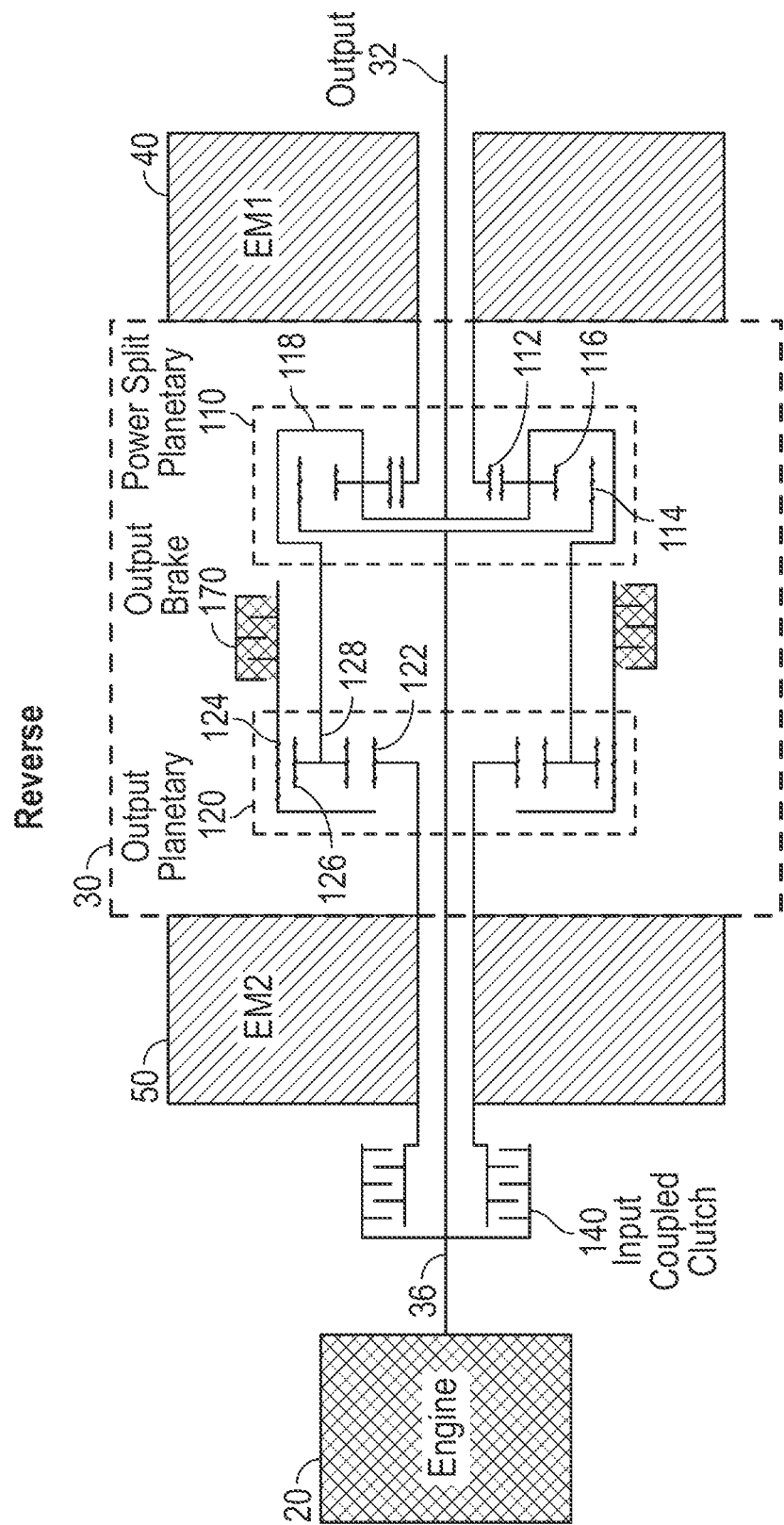
FIG. 7 is a detailed schematic view of the drive train of FIG. 2 configured in a reverse mode of operation.

As shown in FIG. 7, the transmission 30 is selectively reconfigured into a reverse mode of operation such that the transmission 30 allows for a reverse output operation. In some embodiments, the reverse mode of operation is a low speed reverse mode of operation such that the transmission 30 allows for a low reverse speed output operation. In one embodiment, the engine 20 provides a rotational mechanical energy input such that the first electromagnetic device 40 generates electrical power, and the second electromagnetic device 50 uses the generated electrical power to provide a rotational mechanical energy input to the transmission 30. As such, at least one of the engine 20 and the second electromagnetic device 50 provides a rotational mechanical energy input to drive at least one of the tires 62 and the tires 72 in a reverse direction (e.g., backwards). In an alternative embodiment, the second electromagnetic device 50 operates as a generator and the first electromagnetic device 40 operates as a motor when the transmission 30 is configured in the reverse mode. In still another alternative embodiment, both the first electromagnetic device 40 and the second electromagnetic device 50 operate as a generator in the reverse mode.

As shown in FIG. 7 and Table 1, the output brake 170 is engaged when the transmission 30 is configured in the reverse mode. As shown in FIG. 7, the output brake 170 rotationally fixes the ring gear 124. According to the exemplary embodiment shown in FIG. 7, an energy flow path for the reverse mode includes: the engine 20 providing a rotational mechanical energy input to the connecting shaft 36 that is conveyed to the ring gear 114; and the ring gear 114 driving the plurality of planetary gears 116 to rotate about central axes thereof, as well as about the sun gear 112 such that both the carrier 118 and the sun gear 112 rotate.

Referring still to FIG. 7, the rotation of the carrier 118 drives the carrier 128, which rotates the plurality of planetary gears 126 about central axes thereof, as well as about the sun gear 122. With the ring gear 124 fixed by the output brake 170, the second electromagnetic device 50 may operate as a motor. In one embodiment, the second electromagnetic device 50 receives electrical energy generated by the first electromagnetic device 40. Accordingly, the first electromagnetic device 40 operates as a generator, removing a rotational mechanical energy from the sun gear 112. The second electromagnetic device 50 receives electrical energy from the first electromagnetic device 40, applying a rotational mechanical torque to the sun gear 122. The sun gear 122 conveys the rotational mechanical torque to the plurality of planetary gears 126 such that each further rotates about the sun gear 122 (e.g., at an increased rotational speed, etc.). The rotation of the plurality of planetary gears 126 (e.g., effected by the sun gear 122, etc.) drives the carrier 128 and thereby the carrier 118. The carrier 118 drives the output shaft 32 at a reverse output speed and may thereby drive a vehicle at a reverse output speed.

Figure 8:
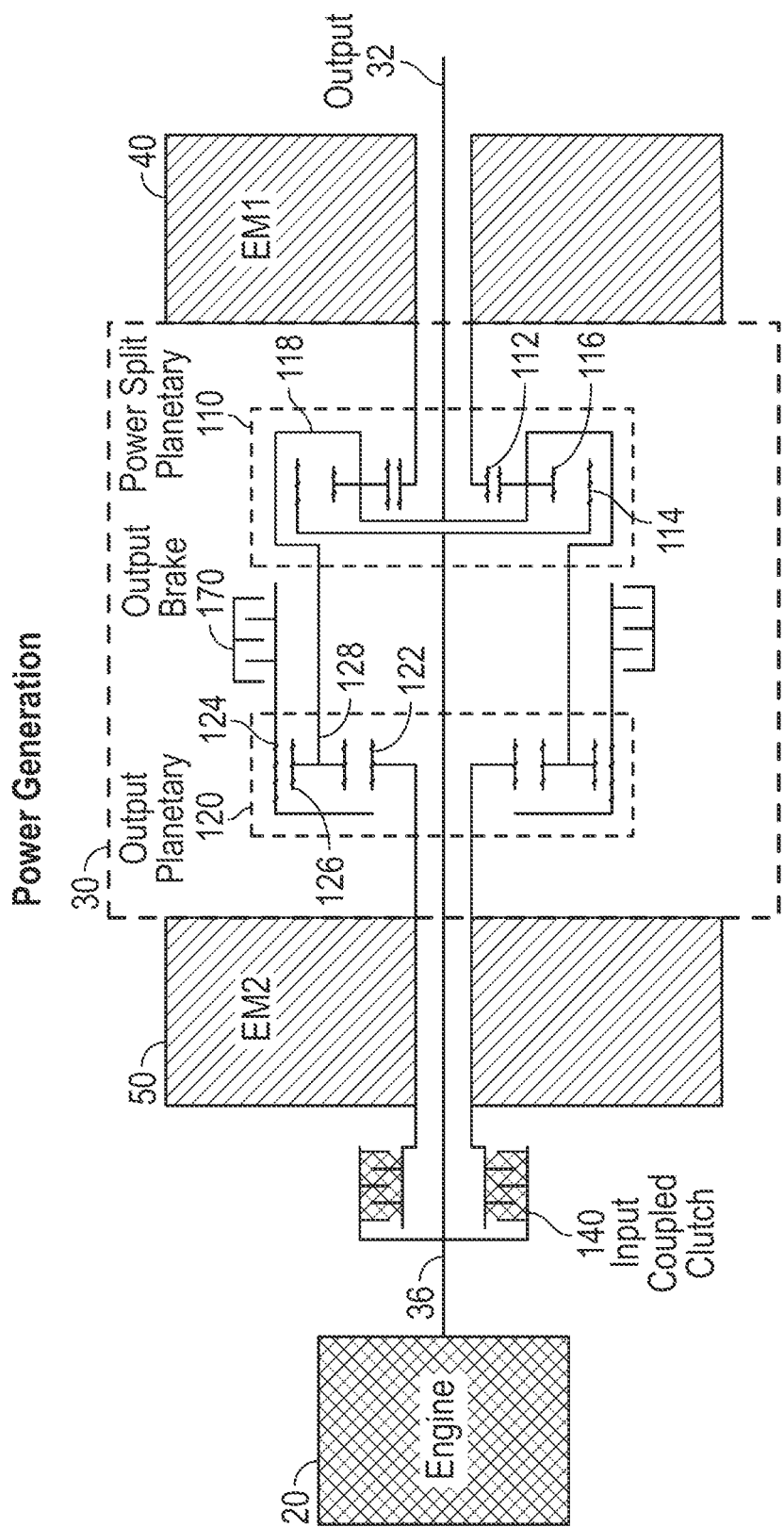
FIG. 8 is a detailed schematic view of the drive train of FIG. 2 configured in a power generation mode of operation.

As shown in FIG. 8, the transmission 30 is selectively reconfigured into a power generation mode such that rotation of the connecting shaft 36 rotates the first electromagnetic device 40 and/or the second electromagnetic device 50 to generate electrical power. In one embodiment, the electrical power is stored for future use (e.g., in the electrical energy supply 52). In another embodiment, the electrical power is used to power internal devices (e.g., the control system 200, components of the vehicle, etc.) and/or external devices. As shown in FIG. 8 and Table 1, the input coupled clutch 140 is engaged when the transmission 30 is configured in the power generation mode.

According to an exemplary embodiment, the engine 20 provides a rotational mechanical energy input to the connecting shaft 36, which drives both the first electromagnetic device 40 and the second electromagnetic device 50. As shown in FIG. 8, the second electromagnetic device 50 is rotationally coupled to the engine 20 via the engagement of the input coupled clutch 140 with the connecting shaft 36 such that the second electromagnetic device 50 generates electrical power. According to the exemplary embodiment shown in FIG. 8, an energy flow path for the power generation mode includes: the connecting shaft 36 provides rotational mechanical energy to the ring gear 114 of the power split planetary 110; the ring gear 114 conveys the rotational mechanical energy from the connecting shaft 36 to the plurality of planetary gears 116; the plurality of planetary gears 116 rotate about central axes thereof, thereby transferring rotational mechanical energy to the sun gear 112; the sun gear 112 provides the rotational mechanical energy from the engine 20 to the first electromagnetic device 40 via the shaft of the first electromagnetic device 40 such that the first electromagnetic device 40 generates electrical power. In some embodiments, a brake is applied to the front axle 60 and/or the rear axle 70 to prevent movement of the vehicle 10 in the power generation mode.

According to an alternative embodiment, the engine 20 does not provide a rotational mechanical energy input to drive a vehicle. By way of example, the first electromagnetic device 40, the second electromagnetic device 50, the electrical energy supply 52, and/or another device may store energy during the above mentioned modes of operation. When sufficient energy is stored (e.g., above a threshold level, etc.), at least one of the first electromagnetic device 40 and the second electromagnetic device 50 may provide a rotational mechanical energy output such that the vehicle is driven without an input from the engine 20 (e.g., an electric mode, etc.).

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle and drive system as shown in the various exemplary embodiments is illustrative only. Additionally, any element disclosed in one embodiment may be incorporated or utilized with any other embodiment disclosed herein. For example, the drive system 100 of the exemplary embodiment shown in at least FIG. 2 may be incorporated in the vehicle 10 of the exemplary embodiment shown in at least FIG. 1. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A drive system for a vehicle, comprising:
a first electromagnetic device directly coupled to a first planetary gear set; and
a second electromagnetic device directly coupled to a second planetary gear set;
wherein:
the first planetary gear set is directly coupled to a primary mover of the vehicle via a connecting shaft;
the first planetary gear set and the second planetary gear set are radially aligned with the connecting shaft;
in a first mode of operation, a clutch is engaged to couple the second planetary gear set to the first planetary gear set and a brake is disengaged to allow rotation of the second planetary gear set;
in a second mode of operation, the brake is engaged to limit rotation of the second planetary gear set and the clutch is disengaged; and
in a third mode of operation, both the clutch and the brake are disengaged such that the connecting shaft is driven by the primary mover without providing output power to tractive elements of the vehicle.

2. The drive system of claim 1, further comprising an output shaft coupled to the first planetary gear set, wherein the output shaft is configured to transport power from the first electromagnetic device and the second electromagnetic device to a tractive element of the vehicle.

3. The drive system of claim 2, wherein the output shaft extends away from the first planetary gear set and through the first electromagnetic device.

4. The drive system of claim 2, wherein the output shaft is directly coupled to the first planetary gear set.

5. The drive system of claim 1, wherein the first planetary gear set and the second planetary gear set are disposed between the first electromagnetic device and the second electromagnetic device.

6. A drive system for a vehicle, comprising:
a first electromagnetic device coupled to a first gear set;
a second electromagnetic device coupled to a second gear set;
an output shaft coupled to the first gear set, wherein the output shaft is configured to transport power from the first electromagnetic device and the second electromagnetic device to a tractive element of the vehicle;
a clutch positioned to selectively rotationally couple a sun gear of the second gear set to the first gear set when engaged;
a brake positioned to selectively limit movement of a ring gear of the second gear set when engaged; and
a connecting shaft directly coupling a primary mover of the vehicle to the ring gear of the second gear set.

7. The drive system of claim 6, wherein:
in a first mode of operation, the clutch is engaged to couple the sun gear to the first gear set and the brake is disengaged; and
in a second mode of operation, the brake is engaged to limit rotation of the ring gear and the clutch is disengaged.

8. The drive system of claim 6, wherein the first gear set and the second gear set are radially aligned with the connecting shaft.

9. The drive system of claim 6, wherein in a third mode of operation, both the clutch and the brake are disengaged such that the connecting shaft is driven by the primary mover without providing output power to the tractive element of the vehicle.

10. The drive system of claim 6, wherein the output shaft extends away from the first gear set and through the first electromagnetic device.

11. The drive system of claim 6, wherein the output shaft is directly coupled to the first gear set.

12. The drive system of claim 6, wherein the first gear set and the second gear set are disposed between the first electromagnetic device and the second electromagnetic device.

* * * * *